US012587518B2

(12) United States Patent  
Jogand-Coulomb

(10) Patent No.: US 12,587,518 B2  
(45) Date of Patent: Mar. 24, 2026

(54) WEBSITE VERIFICATION WITH PROOF OF ORIGIN

(71) Applicant: Toppan Security SAS, Paris (FR)

(72) Inventor: Fabrice Jogand-Coulomb, Aix en Provence (FR)

(73) Assignee: Toppan Security SAS, Paris (FR)

( * ) Notice: Subject to any disclaimer, the term of this patent is extended or adjusted under 35 U.S.C. 154(b) by 0 days.

(21) Appl. No.: 18/691,961

(22) PCT Filed: Sep. 20, 2022

(86) PCT No.: PCT/EP2022/076086  
§ 371 (c)(1),  
(2) Date: Mar. 14, 2024

(87) PCT Pub. No.: WO2023/041800  
PCT Pub. Date: Mar. 23, 2023

(65) Prior Publication Data  
US 2024/0380741 A1 Nov. 14, 2024

(30) Foreign Application Priority Data

Sep. 20, 2021 (FR) ...................................... 2109873

(51) Int. Cl.  
*H04L 9/40* (2022.01)

(52) U.S. Cl.  
CPC .................................. *H04L 63/08* (2013.01)

(58) Field of Classification Search  
CPC ..... H04L 63/08; H04L 63/1483; G06F 21/31; G06F 21/36; H04W 12/77; H04W 12/068  
See application file for complete search history.

(56) References Cited

U.S. PATENT DOCUMENTS

| 7,079,499 B1 * | 7/2006 | Akhtar | .............. | H04W 36/0011 |
| | | | | 370/310 |
| 7,593,355 B1 * | 9/2009 | Surazski | ............. | H04L 65/1046 |
| | | | | 370/352 |

(Continued)

FOREIGN PATENT DOCUMENTS

| GB | 2555384 | 5/2018 |
| WO | 2023041800 | 3/2023 |

OTHER PUBLICATIONS

"France Application Serial No. 2109873, Office Action mailed Sep. 24, 2021", with machine English translation, 4 pages.

(Continued)

*Primary Examiner* — Aravind K Moorthy  
(74) *Attorney, Agent, or Firm* — Schwegman Lundberg & Woessner, P.A.

(57) ABSTRACT

Various systems and methods for securely transacting over the Internet are described herein. The systems and methods receive, at a credential application executing on a mobile device, a disambiguation payload based on an interaction with a web service. The systems and methods receive, by the credential application, information representing the web service. The systems and methods verify, by the credential application, that an identity of the web service matches the web service represented by the information. The systems and methods, in response to successfully verifying that the identity of the web service matches the web service represented by the information, connecting to the confirmed web service for providing one or more credentials from the credential application.

21 Claims, 12 Drawing Sheets

(56)  References Cited

U.S. PATENT DOCUMENTS

| | | | | |
|---|---|---|---|---|
| 8,296,477 | B1 * | 10/2012 | Polk | G06Q 99/00 710/16 |
| 8,776,196 | B1 * | 7/2014 | Oliver | H04L 63/1483 726/5 |
| 9,154,949 | B1 * | 10/2015 | Bertz | H04L 63/0853 |
| 9,686,226 | B1 * | 6/2017 | Gardner | H04L 61/4511 |
| 9,881,296 | B1 * | 1/2018 | Paulin | G06Q 20/325 |
| 9,887,992 | B1 * | 2/2018 | Venkat | G06F 21/35 |
| 9,888,337 | B1 * | 2/2018 | Zalewski | G06Q 30/0635 |
| 10,182,048 | B1 * | 1/2019 | Sabanayagam | H04W 4/14 |
| 10,206,099 | B1 * | 2/2019 | Trinh | H04W 4/021 |
| 10,366,315 | B1 * | 7/2019 | Kumar | G06F 16/93 |
| 10,375,060 | B1 * | 8/2019 | Graves | H04W 12/77 |
| 10,496,835 | B1 * | 12/2019 | Siddiqui | G06K 19/06037 |
| 10,581,866 | B1 * | 3/2020 | Edwards | H04L 63/102 |
| 10,630,671 | B2 * | 4/2020 | Pandian | H04L 67/02 |
| 10,929,670 | B1 * | 2/2021 | Troy | G06V 20/20 |
| 11,030,299 | B1 * | 6/2021 | Ilincic | G06F 21/45 |
| 11,048,794 | B1 * | 6/2021 | Bordow | H04L 63/102 |
| 11,075,766 | B1 * | 7/2021 | Norton | H04L 9/0819 |
| 11,422,830 | B1 * | 8/2022 | Hefley | G06F 9/44505 |
| 12,015,638 | B1 * | 6/2024 | Zohar | H04L 67/10 |
| 12,166,638 | B1 * | 12/2024 | Stevens | G16Y 40/40 |
| 2002/0087624 | A1 * | 7/2002 | Liebenow | G06F 16/9574 715/745 |
| 2003/0237002 | A1 * | 12/2003 | Oishi | H04L 63/08 726/10 |
| 2004/0243853 | A1 * | 12/2004 | Swander | H04L 63/0236 726/14 |
| 2005/0114435 | A1 * | 5/2005 | DiPlacido | H04L 69/329 709/201 |
| 2005/0185658 | A1 * | 8/2005 | Kamiwada | H04L 61/30 370/401 |
| 2006/0113379 | A1 * | 6/2006 | Cricco | H04W 8/245 235/380 |
| 2007/0156919 | A1 * | 7/2007 | Potti | H04L 41/5003 709/238 |
| 2007/0220115 | A1 * | 9/2007 | Srinivasan | H04L 67/51 709/219 |
| 2008/0082626 | A1 * | 4/2008 | Kaler | H04L 63/0823 709/217 |
| 2009/0307190 | A1 * | 12/2009 | Maresca | G06F 16/245 |
| 2010/0318631 | A1 * | 12/2010 | Shukla | H04L 61/4511 709/219 |
| 2012/0030735 | A1 * | 2/2012 | Sato | H04L 63/08 726/5 |
| 2012/0124546 | A1 * | 5/2012 | Roshen | G06F 16/9032 707/E17.107 |
| 2012/0151277 | A1 * | 6/2012 | Jung | G06F 11/0751 714/E11.02 |
| 2013/0111208 | A1 * | 5/2013 | Sabin | G06F 21/36 713/176 |
| 2013/0125221 | A1 | 5/2013 | Agrawal | |
| 2013/0139049 | A1 * | 5/2013 | Park | G06F 40/00 715/234 |
| 2013/0166918 | A1 * | 6/2013 | Shahbazi | H04L 9/0863 713/183 |
| 2013/0167208 | A1 * | 6/2013 | Shi | H04L 63/18 726/5 |
| 2013/0173754 | A1 * | 7/2013 | van Os | H04L 67/02 709/219 |
| 2013/0219381 | A1 * | 8/2013 | Lovitt | G06F 8/65 717/173 |
| 2013/0219479 | A1 * | 8/2013 | DeSoto | G06Q 20/4014 726/6 |
| 2014/0022281 | A1 * | 1/2014 | Georgeson | G06F 3/1454 345/633 |
| 2014/0033273 | A1 * | 1/2014 | Rathbun | H04L 63/08 726/3 |
| 2014/0101036 | A1 * | 4/2014 | Phillips | G06Q 20/3229 705/39 |
| 2014/0108810 | A1 * | 4/2014 | Chenna | H04L 9/3263 713/179 |
| 2014/0142979 | A1 * | 5/2014 | Mitsunaga | G16H 10/60 705/3 |
| 2014/0223175 | A1 * | 8/2014 | Bhatnagar | H04L 63/18 713/159 |
| 2014/0245388 | A1 * | 8/2014 | Nako | H04L 63/0853 726/3 |
| 2014/0278895 | A1 * | 9/2014 | Grimes | G09B 7/08 726/28 |
| 2014/0282961 | A1 * | 9/2014 | Dorfman | G06Q 20/3276 726/7 |
| 2014/0365778 | A1 * | 12/2014 | Wang | G06F 21/45 713/175 |
| 2015/0071440 | A1 * | 3/2015 | Raghupathy | G06F 21/6245 380/258 |
| 2015/0089613 | A1 * | 3/2015 | Tippett | H04L 63/18 726/7 |
| 2015/0108211 | A1 * | 4/2015 | Higgins | G06K 5/00 235/375 |
| 2015/0127714 | A1 * | 5/2015 | Ivashyn | G06F 21/42 709/203 |
| 2015/0237163 | A1 * | 8/2015 | Ou | H04L 67/1097 709/219 |
| 2015/0261748 | A1 * | 9/2015 | Sng | G06F 16/93 707/608 |
| 2015/0269266 | A1 * | 9/2015 | Kuroda | G06F 16/957 715/234 |
| 2015/0288682 | A1 * | 10/2015 | Bisroev | G16H 40/20 713/172 |
| 2015/0373523 | A1 * | 12/2015 | Jeong | H04L 41/5029 455/406 |
| 2016/0034990 | A1 * | 2/2016 | Kannair | H04L 63/083 705/26.35 |
| 2016/0057100 | A1 * | 2/2016 | Blinn | H04L 67/53 709/219 |
| 2016/0087949 | A1 * | 3/2016 | Deleeuw | H04W 12/50 713/170 |
| 2016/0092858 | A1 * | 3/2016 | Giles | G06Q 20/382 705/14.1 |
| 2016/0125458 | A1 * | 5/2016 | Enriquez | G06Q 30/0267 705/14.27 |
| 2016/0182482 | A1 * | 6/2016 | Koo | H04L 63/102 726/7 |
| 2016/0226871 | A1 * | 8/2016 | Stephure | H04L 67/146 |
| 2016/0294556 | A1 * | 10/2016 | Vortriede | H04L 9/321 |
| 2016/0323108 | A1 * | 11/2016 | Bhogal | H04W 12/08 |
| 2016/0337351 | A1 * | 11/2016 | Spencer | H04L 63/0876 |
| 2016/0351080 | A1 * | 12/2016 | Bhatnagar | G09C 5/00 |
| 2017/0026321 | A1 * | 1/2017 | Ciavatta | H04L 51/04 |
| 2017/0041309 | A1 * | 2/2017 | Ekambaram | H04L 63/1483 |
| 2017/0070487 | A1 * | 3/2017 | Greenberg | H04W 12/02 |
| 2017/0094514 | A1 * | 3/2017 | Kelts | H04L 67/02 |
| 2017/0171221 | A1 * | 6/2017 | Ho | G06F 21/44 |
| 2017/0201377 | A1 * | 7/2017 | Tang | H04L 9/3247 |
| 2018/0046330 | A1 * | 2/2018 | Chuchro | H04L 67/535 |
| 2018/0167411 | A1 * | 6/2018 | Bhageria | H04L 63/1483 |
| 2018/0212947 | A1 * | 7/2018 | Chen | H04W 12/06 |
| 2018/0343283 | A1 * | 11/2018 | Goutal | H04L 63/06 |
| 2019/0065622 | A1 * | 2/2019 | Imai | G06F 16/90328 |
| 2019/0095257 | A1 * | 3/2019 | Bhatia | G06F 11/0706 |
| 2019/0156020 | A1 * | 5/2019 | Sato | H04L 9/0894 |
| 2019/0236581 | A1 * | 8/2019 | Hartung | G06Q 20/1085 |
| 2019/0257822 | A1 * | 8/2019 | Scherr | G06K 7/1434 |
| 2019/0286851 | A1 * | 9/2019 | Fang | G06F 16/9566 |
| 2019/0319983 | A1 * | 10/2019 | Shi | H04L 63/1408 |
| 2019/0320898 | A1 * | 10/2019 | Dirghangi | A61B 3/0033 |
| 2019/0332754 | A1 * | 10/2019 | Andersen | H04L 63/0884 |
| 2019/0386981 | A1 * | 12/2019 | Ramesh Kumar | H04L 9/3228 |
| 2020/0187004 | A1 * | 6/2020 | Reimer | H04L 63/083 |
| 2020/0204461 | A1 * | 6/2020 | Fang | H04L 43/55 |
| 2020/0336904 | A1 * | 10/2020 | Maleknejad | H04W 12/106 |
| 2021/0029107 | A1 * | 1/2021 | Parkinson | H04L 9/3213 |
| 2021/0035083 | A1 * | 2/2021 | Kohli | H04W 12/37 |
| 2021/0036851 | A1 * | 2/2021 | Villapakkam | G06F 21/602 |
| 2021/0081736 | A1 * | 3/2021 | Ragusa | G06K 19/06178 |
| 2021/0234832 | A1 * | 7/2021 | Wood | H04L 63/1408 |
| 2021/0258308 | A1 * | 8/2021 | Avetisov | H04L 9/0825 |
| 2021/0326417 | A1 * | 10/2021 | Cabrera | G06K 7/1417 |

(56)          References Cited

U.S. PATENT DOCUMENTS

| | | | |
|---|---|---|---|
| 2021/0377309 A1* | 12/2021 | Jogand-Coulomb | ........................ |
| | | | G06K 7/10366 |
| 2021/0392054 A1* | 12/2021 | David | .................... H04L 67/568 |
| 2022/0067685 A1* | 3/2022 | Crooks | .................... G07G 1/14 |
| 2022/0078293 A1* | 3/2022 | Hanano | ................ H04N 1/4406 |
| 2022/0095116 A1* | 3/2022 | Abdollahian | ........ G06K 7/1417 |
| 2022/0232010 A1* | 7/2022 | Zhang | ..................... G06F 21/44 |
| 2022/0239495 A1* | 7/2022 | Norton | ................. H04L 9/0825 |
| 2022/0247750 A1* | 8/2022 | Kaidi | .................. G06F 11/3006 |
| 2022/0353263 A1* | 11/2022 | Choyi | ..................... H04L 12/12 |
| 2022/0414055 A1* | 12/2022 | Collier | ................. G06F 16/116 |
| 2022/0417744 A1* | 12/2022 | Ilincic | .................. H04W 12/06 |
| 2023/0021213 A1* | 1/2023 | Sayyed | .................. G06F 21/31 |
| 2023/0028416 A1* | 1/2023 | Mason | .................... H04L 63/20 |
| 2023/0065676 A1* | 3/2023 | Obstfeld | ................ H04L 67/12 |
| 2023/0072072 A1* | 3/2023 | Valecha | ............... H04L 63/083 |
| 2023/0106011 A1* | 4/2023 | Marin | .................. G06K 7/1421 |
| | | | 235/462.11 |

OTHER PUBLICATIONS

"International Application Serial No. PCT EP2022 076086, International Search Report mailed Jan. 12, 2023", 4 pgs.

"International Application Serial No. PCT EP2022 076086, Written Opinion mailed Jan. 12, 2023", 9 pgs.

Lin, Pin-Yen Peter, "Keeping Passwords In Your Pocket: Managing Password Locally With Mobile Fingerprint Sensors", Proceedings of the 28th ACM Joint Meeting on European Software Engineering Conference and Symposium on Thefoundations of Software Engineering, ACM, (Apr. 20, 2020), 124-125.

"European Application Serial No. 22790308.5, Indication of deficiencies in a request under Rule 22 EPC mailed May 6, 2024", 3 pgs.

"European Application Serial No. 22790308.5, Response filed Oct. 29, 2024 to Communication pursuant to Rules 161(1) and 162 EPC mailed Apr. 30, 2024", 73 pgs.

* cited by examiner

800

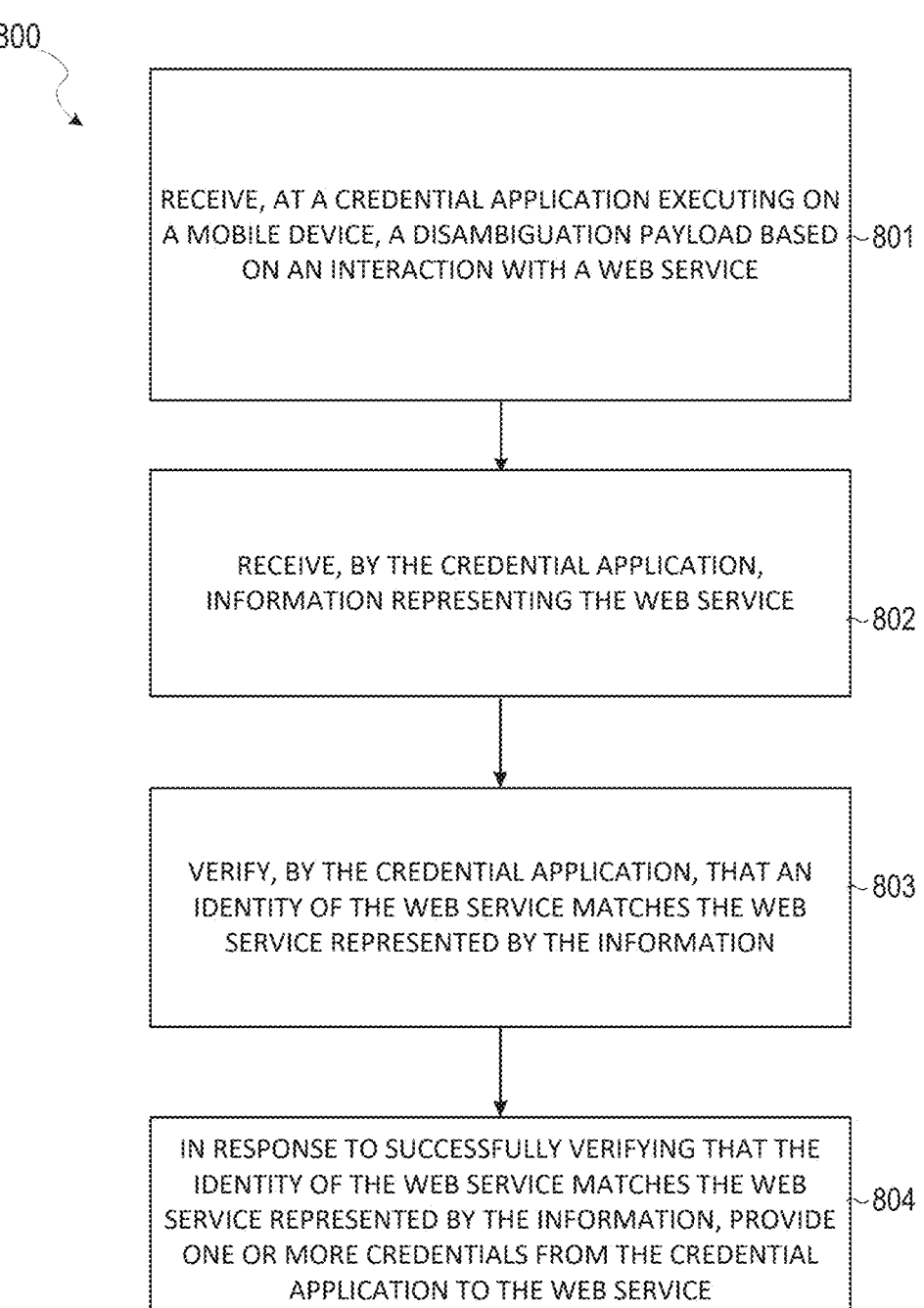

RECEIVE, AT A CREDENTIAL APPLICATION EXECUTING ON A MOBILE DEVICE, A DISAMBIGUATION PAYLOAD BASED ON AN INTERACTION WITH A WEB SERVICE ~801

RECEIVE, BY THE CREDENTIAL APPLICATION, INFORMATION REPRESENTING THE WEB SERVICE ~802

VERIFY, BY THE CREDENTIAL APPLICATION, THAT AN IDENTITY OF THE WEB SERVICE MATCHES THE WEB SERVICE REPRESENTED BY THE INFORMATION ~803

IN RESPONSE TO SUCCESSFULLY VERIFYING THAT THE IDENTITY OF THE WEB SERVICE MATCHES THE WEB SERVICE REPRESENTED BY THE INFORMATION, PROVIDE ONE OR MORE CREDENTIALS FROM THE CREDENTIAL APPLICATION TO THE WEB SERVICE ~804

*FIG. 8*

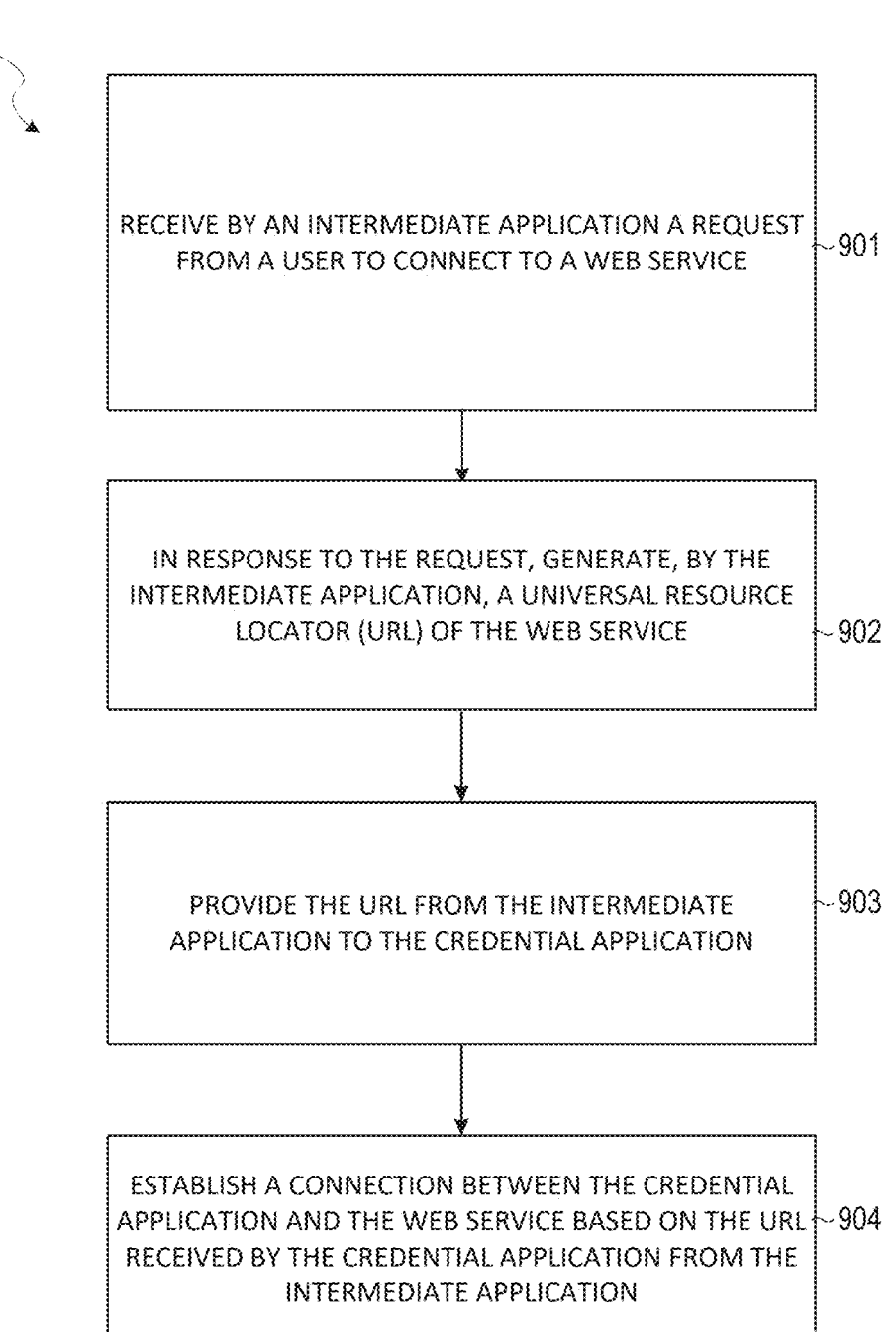

900

RECEIVE BY AN INTERMEDIATE APPLICATION A REQUEST FROM A USER TO CONNECT TO A WEB SERVICE ~901

IN RESPONSE TO THE REQUEST, GENERATE, BY THE INTERMEDIATE APPLICATION, A UNIVERSAL RESOURCE LOCATOR (URL) OF THE WEB SERVICE ~902

PROVIDE THE URL FROM THE INTERMEDIATE APPLICATION TO THE CREDENTIAL APPLICATION ~903

ESTABLISH A CONNECTION BETWEEN THE CREDENTIAL APPLICATION AND THE WEB SERVICE BASED ON THE URL RECEIVED BY THE CREDENTIAL APPLICATION FROM THE INTERMEDIATE APPLICATION ~904

GENERATE A QUICK RESPONSE (QR) CODE BY THE INTERMEDIATE APPLICATION ~1001

ACTIVATE A CAMERA APPLICATION ON THE MOBILE DEVICE ~1002

CAPTURE AN IMAGE OF THE QR CODE BY THE MOBILE DEVICE ~1003

OPEN THE URL ASSOCIATED WITH THE QR CODE BY A SECOND INTERMEDIATE APPLICATION IMPLEMENTED ON THE MOBILE DEVICE IN RESPONSE TO CAPTURING THE IMAGE ~1004

WEBSITE VERIFICATION WITH PROOF OF ORIGIN

PRIORITY APPLICATIONS

This application is a U.S. National Stage filing under 35 U.S.C. § 371 of PCT Patent Application No. PCT/EP2022/076086, filed on Sep. 20, 2022, which claims priority to French Application Number FR2109873, filed Sep. 20, 2021, the disclosures of which are incorporated herein in their entirety by reference.

TECHNICAL FIELD

Embodiments described herein generally relate to electronic credential systems, and in particular, to establishing a secure session between an undetermined application and an online service in need of one or more identity credentials.

BACKGROUND

Electronic identity documents may be stored in secure applications on a mobile device. Such an implementation is often referred to as a mobile identification (ID). Mobile IDs are replacing classical physical identification documents (e.g., passports or drivers' licenses) and bring many advantages to these types of documents. Mobile IDs may be encrypted to provide safeguards against losing data. Multiple credentials may be stored together in a single mobile ID application. Further, mobile IDs may provide additional ways to authenticate the identity stored thereon, providing law enforcement, commercial enterprises, banks, and others a more secure and robust mechanism to verify a person's identification.

SUMMARY

In some aspects, the techniques described herein relate to a method including: receiving, at a credential application executing on a mobile device, a disambiguation payload based on an interaction with a web service; receiving, by the credential application, information representing the web service; verifying, by the credential application, that an identity of the web service matches the web service represented by the information; and in response to successfully verifying that the identity of the web service matches the web service represented by the information, connecting to the confirmed web service for providing one or more credentials from the credential application.

In some aspects, the techniques described herein relate to a method, wherein the information includes engagement data with proof of origin information.

In some aspects, the techniques described herein relate to a method, wherein the information includes a name of the web service.

In some aspects, the techniques described herein relate to a method, wherein the disambiguation payload is received in response to a user interaction with the web service via an intermediate application installed on the mobile device, the user interaction including selection of a link on a web page associated with the web service.

In some aspects, the techniques described herein relate to a method, wherein the disambiguation payload is received in response to a user interaction with the web service via an intermediate application installed on a given device that is separate from the mobile device.

In some aspects, the techniques described herein relate to a method, further including: scanning, by the intermediate application, a quick response (QR) code displayed by the intermediate application installed on the given device.

In some aspects, the techniques described herein relate to a method, wherein receiving the information includes: prompting, by the credential application, a user to input a name of the web service; and comparing the name of the web service to the identity of the web service.

In some aspects, the techniques described herein relate to a method, further including obtaining the identity of the web service from the disambiguation payload.

In some aspects, the techniques described herein relate to a method, further including: generating for display, by the credential application, a plurality of names of web services, the plurality of names including the name of the web service; and receiving input that selects the name of the web service from the plurality of names of web service that is generated for display.

In some aspects, the techniques described herein relate to a method, wherein the plurality of names of web services includes randomly selected names of web services.

In some aspects, the techniques described herein relate to a method, wherein receiving the information includes: prompting, by the credential application, a user to input a name of the web service; populating a placeholder in a universal resource locator (URL) associated with the disambiguation payload with the name of the web service input by the user; and establishing a connection between the credential application and the web service based on the populated placeholder in the URL.

In some aspects, the techniques described herein relate to a method, wherein receiving the information includes: receiving, by the credential application from an intermediate application used to access the web service, a name of the web service; and comparing the name of the web service to the identity of the web service received in the disambiguation payload.

In some aspects, the techniques described herein relate to a method, further including: receiving by an intermediate application a request from a user to connect to the web service; in response to the request, accessing, by the intermediate application, a universal resource locator (URL) of the web service; providing the accessed URL from the intermediate application to the credential application; and establishing a connection between the credential application and the web service based on the URL received by the credential application from the intermediate application.

In some aspects, the techniques described herein relate to a method, wherein the intermediate application includes a web browser.

In some aspects, the techniques described herein relate to a method, further including: generating a quick response (QR) code by the intermediate application, wherein the URL is provided to the credential application in response to the credential application scanning the QR code.

In some aspects, the techniques described herein relate to a method, wherein the intermediate application is implemented by a first device separate from the mobile device, further including: generating a quick response (QR) code by the intermediate application; activating a camera application on the mobile device; and capturing an image of the QR code by the mobile device.

In some aspects, the techniques described herein relate to a method, further including: opening the URL associated with the QR code by a second intermediate application implemented on the mobile device in response to capturing the image; and providing the identity of the web service from the second intermediate application to the credential application based on the opening of the URL.

In some aspects, the techniques described herein relate to a method, further including: generating for display an option to connect to the web service using the credential application in response to opening the URL.

In some aspects, the techniques described herein relate to a system including: one or more processors configured to perform operations including: receiving, at a credential application executing on a mobile device, a disambiguation payload based on an interaction with a web service; receiving, by the credential application, information representing the web service; verifying, by the credential application, that an identity of the web service matches the web service represented by the information; and in response to successfully verifying that the identity of the web service matches the web service represented by the information, connecting to the confirmed web service for providing one or more credentials from the credential application.

In some aspects, the techniques described herein relate to a system, wherein the operations include: in response to verifying that the identity of the web service matches the web service represented by the information, prompting a user to provide input that selects the one or more credentials from a list of credentials; receiving input from a user that selects the one or more credentials from the list of credentials, wherein the one or more credentials are provided in response to the input.

In some aspects, the techniques described herein relate to an apparatus including: means for receiving, at a credential application executing on a mobile device, a disambiguation payload based on an interaction with a web service; means for receiving, by the credential application, information representing the web service; means for verifying, by the credential application, that an identity of the web service matches the web service represented by the information; and means for, in response to successfully verifying that the identity of the web service matches the web service represented by the information, connecting to the confirmed web service for providing one or more credentials from the credential application.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which:

FIG. 8 is a flowchart illustrating a method for securely transacting over the Internet, according to some examples.

FIG. 9 is a flowchart illustrating a method for confirming a website before connecting to the website, according to some examples.

DETAILED DESCRIPTION

Figure 1:
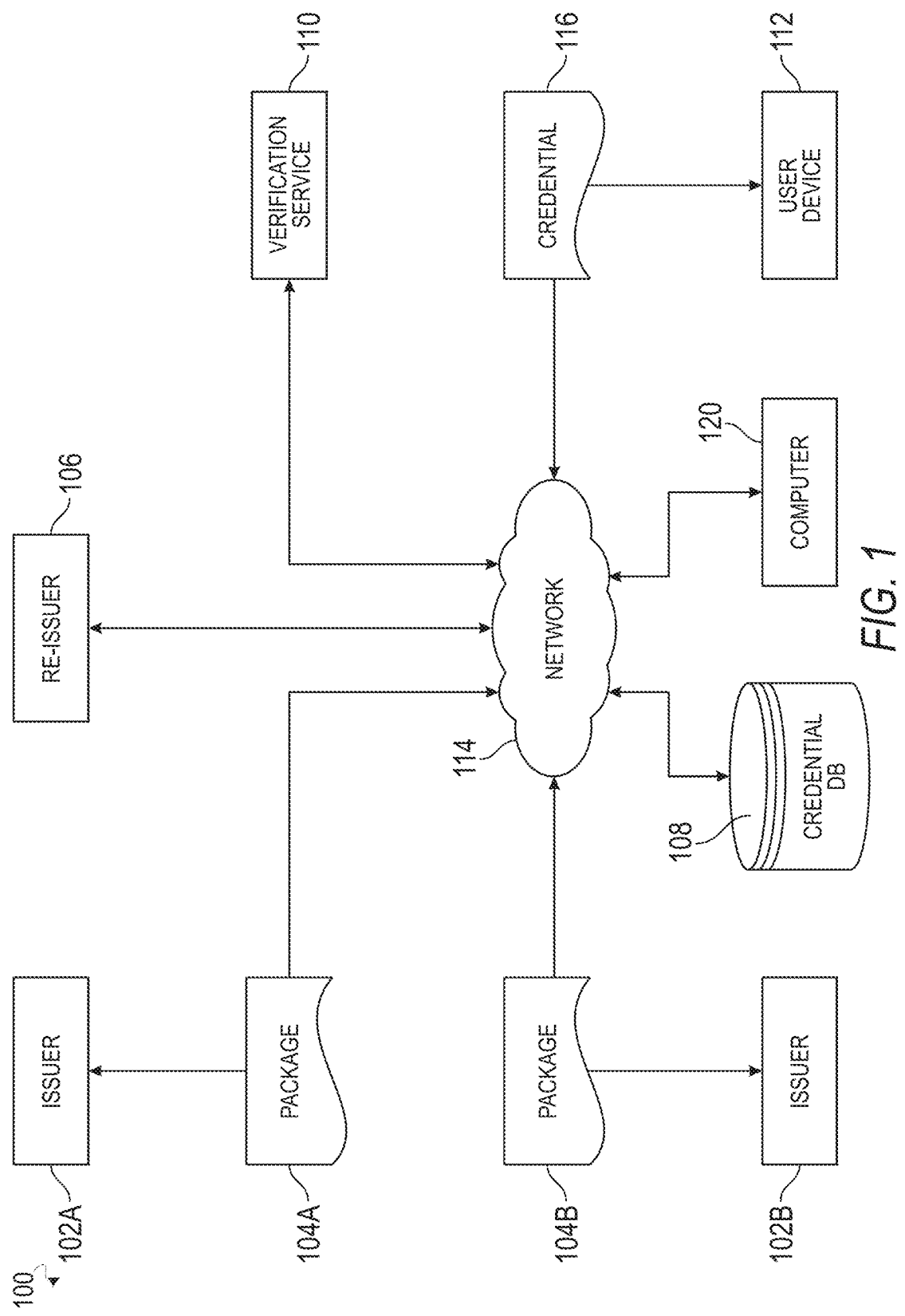
FIG. 1 is a block diagram illustrating a credential system, according to some examples.

In the following description, for purposes of explanation, numerous specific details are set forth in order to provide a thorough understanding of some example embodiments. It will be evident, however, to one skilled in the art that the present disclosure may be practiced without these specific details.

Mobile identification (ID) systems are becoming more popular. Mobile IDs may be implemented with an application ("app") on a smartphone or other mobile device. A credential application is able to enforce access control to protect the user's identity data and to handle different presentation protocols whether in person or over the Internet and according to a type of identity document. Mobile IDs provide other advantages over conventional physical IDs, such as remote provisioning, offline verification, distance verification, and per-attribute data privacy (also known as data minimization). A credential application is able to store multiple credentials (also referred to as identity documents), such as a driver's license, a passport, health insurance, a work identification, or a student ID for instance. Such credentials may be issued by governments, schools, health care systems, or the like.

To use a credential stored in a credential application, the user engages the mobile app to present credentials to a verifier device. The verifier device is able to interrogate the mobile device using various interfaces and obtain the credential information to verify. While use of a verifier device works well when the transaction is person-to-person (e.g., at a checkout lane or a police stop), users and businesses may also want to use the mobile ID to verify an identity document over the Internet. Online, the verifier device may be a system of one or more computers, databases, cloud compute resources, or other components that may be used together to perform verification of credential information.

In an example use case, the user wants to open a bank account and is interacting with the bank through a browser or application. The banking website or application may request that the user validate their identity. To do so, the banking website or application provides a quick response (QR) code in the website or application interface. The QR code may be displayed using a separate device and then scanned using a credential application on the user's device (e.g., a mobile device), or the QR code may be included in a web page displayed on the user's device and the user clicks or otherwise selects the QR code. The scanning or selecting causes credential information to be transmitted from the credential application to the bank. In this way, the banking web server or other backend server is acting as the verifier device.

An issue with this example is that the credential application does not know prior to scanning the QR code where to provide the credential information for the bank web server to receive it. Conversely, the banking web server does not know which credential application the user is using and therefore, does not now which app is going to establish a connection. The bank's backend server universal or uniform resource locator (URL) is provided in the QR code. However, the credential application does not know whether to trust the URL as this may be a malicious web service or a phishing attempt to spoof the credential application and obtain sensitive information or even worse a strategy to hack the user device. This is a new challenge, quite different from classical QR code scan solutions where the QR data is aimed to a specific application and more importantly, the application already knows where to navigate to consume the QR data, such as with a hardcoded network address in the application. Here, a web service prepares a QR code for a credential application typically independent from the web service and the credential application receives the URL to connect to consume the QR data.

Because the credential application is independent from the web service, there is a need to make sure the QR code is associated with the web service to share the credentials with and that the web service is where the end user intends to share his/her credentials. TLS security protocol ensures the name of a website contained in a URL actually belongs to the web service the communication has been established with. However, a malicious website may feature TLS and in cases like this where it is not a closed loop, there is a need to confirm the URL to connect to prior to connecting.

The disclosed techniques provide an improved credential system that provides a process to confirm the web service prior to connecting. Specifically, the disclosed techniques receive, at a credential application executing on a mobile device, a disambiguation payload based on an interaction with a web service. The disambiguation payload can be received in response to the credential application or other intermediate application scanning a QR code and/or in response to a link on a webpage being selected on a device on which the credential application is implemented. The disclosed techniques receive, by the credential application, information representing the web service, such as a user input that includes a name of a website or web service. The disclosed techniques verify, by the credential application, that an identity of the web service (e.g., received via the disambiguation payload) matches the web service represented by the information (e.g., input by the user). The disclosed techniques, in response to successfully verifying that the identity of the web service matches the web service represented by the information, provide one or more credentials from the credential application to the web service.

System Overview

Identity credentials (e.g., electronic documents, cards, etc.) include information such as a first and last name, a date of birth, an address, etc. In the digital world, each piece of information is a data element, and these data elements are combined into a package that is issued to a target user. Having a digital credential provides several advantages. Information and documentation are easy to access. Digital credentials are typically signed for integrity and authenticity and are, therefore, more immune to counterfeiting and corruption than conventional credentials.

Some terms are provided here for common reference. It is understood that these terms are non-limiting and that other terms, phrases, or descriptions of operations, components, or devices in the systems and methods described may be used.

Identity Credential—an Identity Credential is a collection of data elements issued as one or more packages. An aggregated Identity Credential includes two or more packages. Data elements in a package may be included by referencing a data element in another package. A data element reference may retain the confidence level of the original referenced data element. An Identity Credential may include metadata describing the issuer of the credential, expiration or validity dates, or other information about the Identity Credential.

Holder—a Holder is a person who is the legitimate owner of the information in the package or credential. For an identity package, the Holder matches with the identity information. A Holder device may be any type of computer device, such as a mobile phone, smartphone, personal information device, wearable device, laptop, tablet, hybrid machine, or the like. The Holder device may be known as a user device, where the user is the Holder. The Holder device may run a credential application or application where such data are managed during presentation to a Verifier. The Holder device may have an application (or "App") associated with it. A credential application is an application that is stored on, executing on, or otherwise linked to the Holder device. The credential application may be a low-level application, such as a Basic Input Output System (BIOS) or other firmware, a system-level application (e.g., an operating system or a component of an operating system), a user-level application (e.g., an installed application on the Holder device), or a remote application (e.g., a web-based application executing via a browser on the Holder device). The credential application may also be referred to as a mobile ID app.

FIG. 1 is a block diagram illustrating a credential system 100, according to some examples. The credential system 100 includes a first original issuer 102A and a second original issuer 102B (collectively referred to as issuers 102) that issue core packages 104A, 104B (collectively referred to as core packages 104). The core packages 104 include tags and values that are generated by the original issuers 102. The credential system 100 also includes a re-issuer 106 that compiles data from one or more issuers (or re-issuers) in the credential system 100 and re-issues aggregated credentials with contents from two or more packages.

The re-issuer 106 may also add its own data to the aggregate credential by issuing its own package and consolidating the package with data from packages of other issuers 102. The re-issuer 106 may sign its own package, portions of its own package, or the aggregated credential.

A credential database 108 may be used to store packages and other data from one or more issuers 102 or re-issuers 106. The credential database 108 may use a relational database management system (RDBMS) to organize the package information into tables. The credential database 108 may be queried by various entities or users, such as a re-issuer 106, a verification service 110, or a user at a user device 112. A re-issuer 106 may query the credential database 108 to obtain original package information to populate an aggregated credential. The credential database 108 may be implemented on one or more servers. The credential database 108 may be owned or operated by a credential issuing entity. In some examples, issuers access the credential database 108 as part of a service.

The various components of the credential system 100 may communicate over one or more networks 114, which may include any known type of network that facilitates machine-to-machine communications. The network 114 may use the same communication protocols or different protocols without departing from the scope of the present disclosure. The network 114 may include wired or wireless communication technologies. The Internet is an example of a communication network that constitutes an Internet Protocol (IP) network consisting of many computers, computing networks, and other communication devices located all over the world, which are connected through many telephone systems and other means. Other examples of communication networks include, without limitation, a Plain Old Telephone System (POTS), an Integrated Services Digital Network (ISDN), the Public Switched Telephone Network (PSTN), a Local Area Network (LAN), a Wide Area Network (WAN), a Session Initiation Protocol (SIP) network, a Voice over Internet Protocol (VoIP) network, a cellular network, and any other type of packet-switched or circuit-switched network known in the art. In addition, it can be appreciated that the communication network 114 need not be limited to any one network type, and instead may be comprised of several different networks or network types. Moreover, the network 114 may include a number of different communication media such as coaxial cable, copper cable/wire, fiber-optic cable, antennas for transmitting/receiving wireless messages, and combinations thereof.

The user device 112 may be of any type of computing or client device. The user device 112 can be portable in nature, and may take the form of a cellular phone, mobile device, smart phone, personal digital assistant, laptop, tablet, wearable device, portable credential card, key fob, or the like. It should be appreciated that the verification service 110 may be provided by a personal computer, desktop computer, kiosk, payment terminal, beacon, web server, database server, service platform, or the like.

Figure 2:
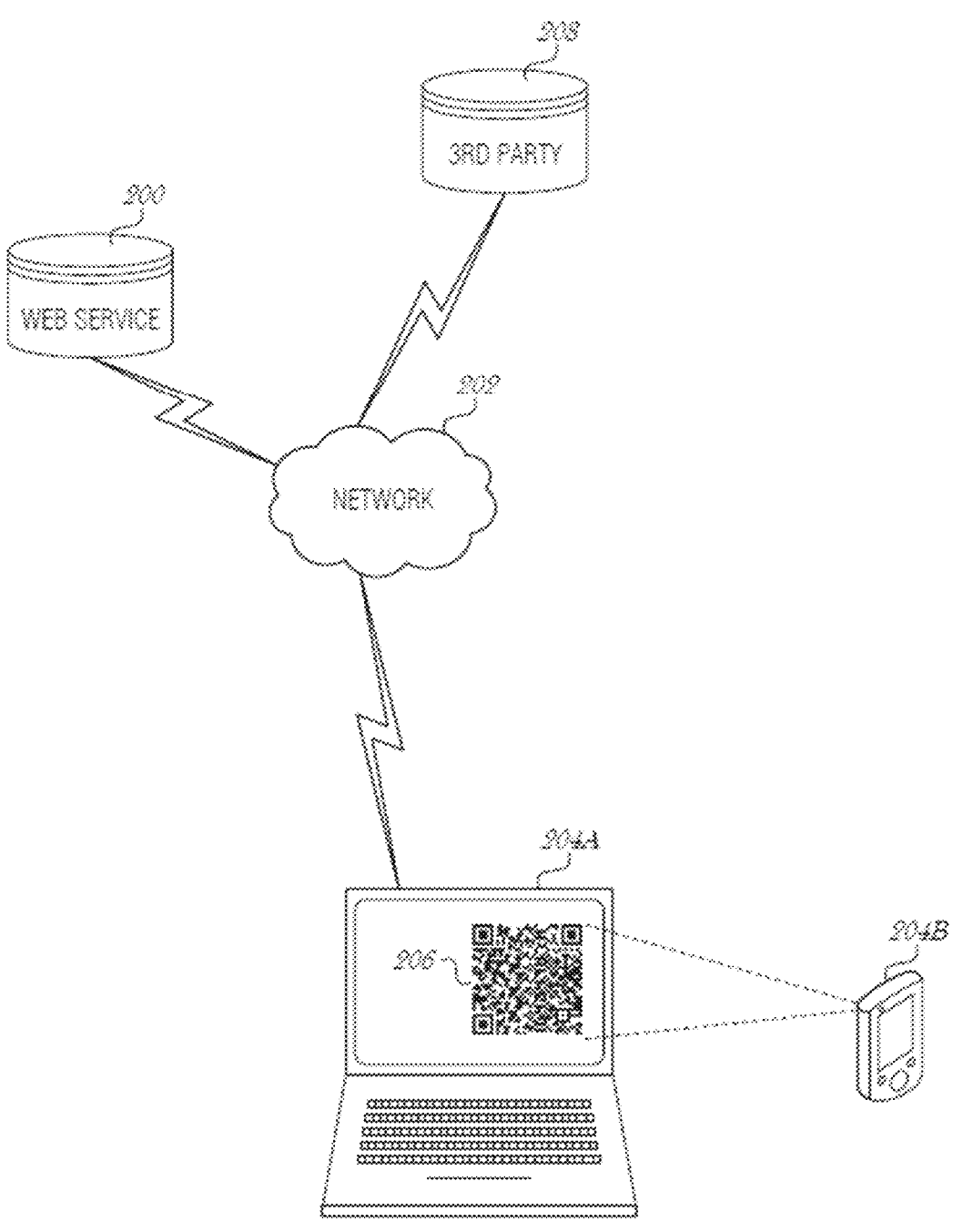
FIG. 2 is a diagram illustrating a system to present a quick response (QR) code containing disambiguation, according to some examples.

A user may be interacting with verification service 110 using a desktop computer 120. This is illustrated in FIG. 2. For instance, the user may be accessing an online banking system through a web browser. During a transaction, the user may be asked to present a credential 116 or part of a credential 116 to the verification service 110. The way this may be requested is through the use of a QR code. A QR code is displayed in the web page and the user is requested to scan the QR code with the user device 112. The user then may scan the QR code with the user device 112. Based on further operations described herein, the user device 112 may then connect to the verification service 110 and engage with the verification service 110. In some cases, the website to connect to is confirmed (e.g., as discussed above and below based on user input of a website name) before engagement the communication with the verification service 110.

Engaging may include a process of authenticating the user device 112 or credential application executing on the user device 112 and the verification service 110 to one another. After the credential application on user device 112 and verification service 110 engage, the user may consent to share the credential 116 or a portion thereof. The verification service 110 may validate the credential 116 by checking the signature of the issuer 102 or re-issuer 106, or accessing the credential 116 from credential database 108 referenced by the credential application. The credential 116 may be stored on the user device 112 and shared with the verification service 110. Alternatively, the credential application may provide a token in a URL for the verifier to obtain the credentials from an issuer database instead of user device 112. The user is then able to continue with the transaction on the web page using the computer 120.

Figure 3:
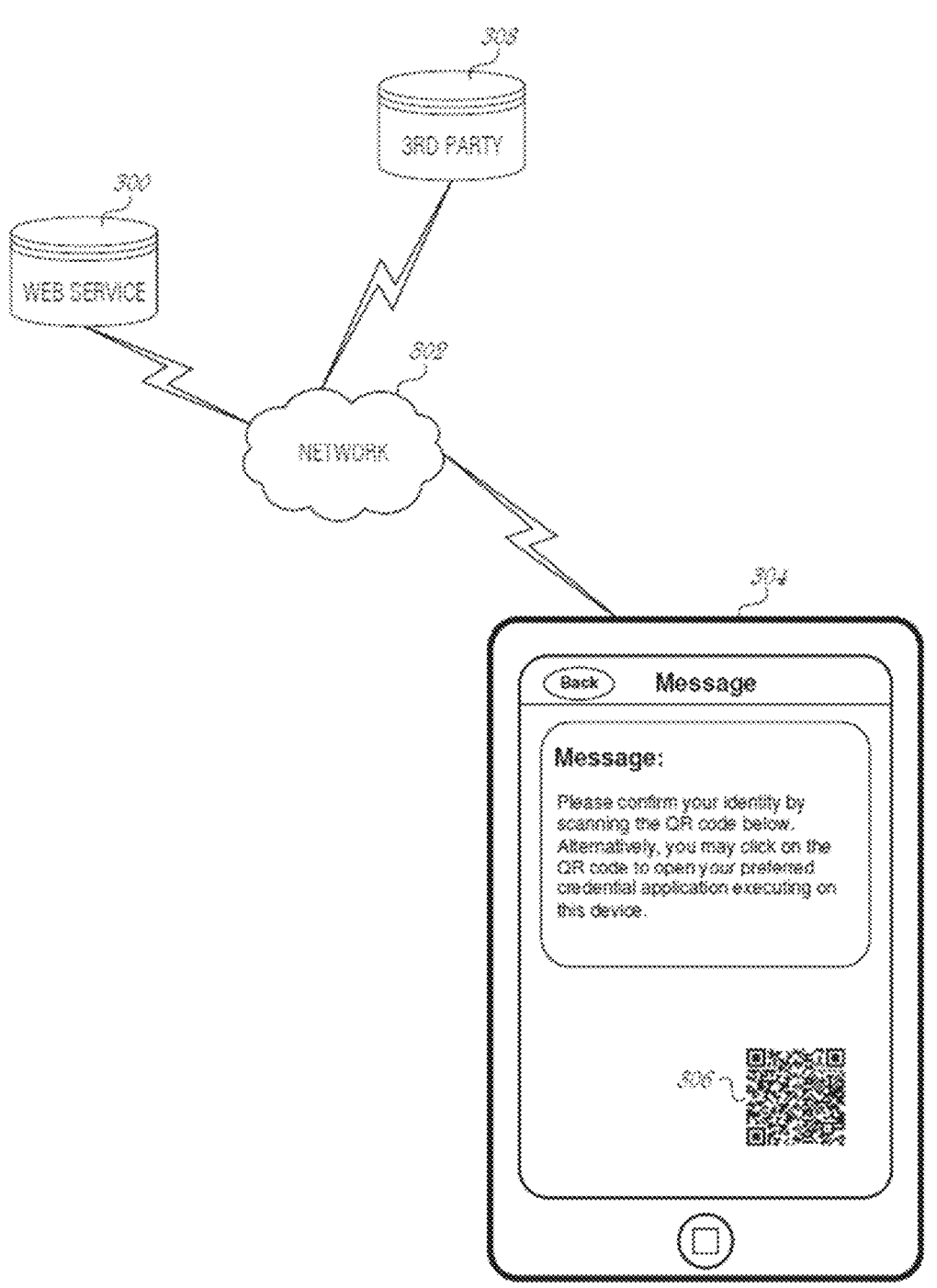
FIG. 3 is a diagram illustrating a system where a user action provides disambiguation data to a credential application, according to some examples.

Alternatively, the user may be conducting an online transaction with a browser executing on the user device 112. This is illustrated in FIG. 3. In this case, it is not convenient for the user device 112 to scan the QR code that is displayed. Instead, active content may be used, such that when the user clicks or activates the active content, information is passed from application to application (e.g., browser to credential app) on the user device 112. As the backend system doesn't know where the "credential app" resides, the active content may be represented by the QR code, thus allowing both type of actions. The active content may be implemented using deep links, scripting, plugins, application-to-application messaging, or other technologies. In an example, the contents of the QR code presented as a clickable image is a hyperlink whose URL is the same content as the QR code. When the user clicks on the QR code, the hyperlink information is used to send the contents of the QR code to the associated app, which could be the credential application or a broker service (or browser extension) on user device 112 that passes the information to the preferred (e.g., a default) credential application. If more than one credential application can be associated with the active content, the user may select a credential application to use.

FIG. 2 is a diagram illustrating a system to use a QR code to disambiguate a relationship between an online service and an unresolved application (e.g., a credential application) selected by a user, according to some examples. A web service 200 is configured, adapted, or programmed to provide an online service. The service may be provided over a network 202 to one or more user devices 204, such as computer 204A or mobile phone 204B. The network 202 may be of any type of network as described herein. The user devices 204 may take the form of a cellular phone, mobile device, smart phone, personal digital assistant, desktop computer, laptop, tablet, wearable device, or the like.

The mobile phone 204B has a credential application (e.g., mobile ID app) installed to manage credential information. When using the online service provided by the web service 200 (e.g., server), the user may be requested to present credential information. In order to submit it, the web service 200 and the mobile phone 204B engage with one another to establish a trust relationship. In order to perform engagement, the web service 200 encodes data in a QR code, which is read by the mobile phone 204B and the engagement is negotiated through back channels. An "unresolved application" in this context is one where the web service does not know, in advance, which credential application is going to connect to the web service.

In some examples, during a transaction, the web service 200 may present a QR code 206 to the user of the computer 204A. The QR code 206 may be presented within a document, such as a web page. In an embodiment, the QR code 206 is delivered by the service hosted at the web service 200 that also delivered the web page. In another example the web page delivered by the web service 200 may reference content from third party 208, and third party 208 may deliver the QR code 206 and, in some cases, use this as an opportunity for phishing the user credentials.

The user scans the QR code 206 with a mobile phone 204B. The mobile device 204 engages with the web service 200 using information encoded in the QR code 206. Prior to engaging with the web service 200, the mobile device 204 may present a confirmation interface to the user, where the user may select which identifying information to share with the web service 200.

FIG. 3 is a diagram illustrating a system where a user action allows disambiguation of a relationship between an online service and an unresolved application selected by the user, according to some examples. Similar to the system illustrated in FIG. 2, a server 300 is configured, adapted, or programmed to provide an online service, which is implemented over a network 302. In this implementation, the server 300 serves a document (e.g., a web page) to the intermediate app (e.g., Internet browser) on a mobile device 304. The document may include content from a third party 308. The mobile device 304 has stored on it a credential application. In an example, the QR code 306 is delivered by the service hosted at server 300 that also delivered the web page. In another embodiment the web page delivered by server 300 may reference content from third party 308, and third party 308 may deliver the QR code 306 and, in some cases, use this as an opportunity for phishing the user credentials.

In this situation, it is not convenient to use the mobile device 304 to scan the QR code 306. Instead, the QR code 306 may be hyperlinked such that when the user activates it (e.g., clicks on the QR code hyperlink), information and control is passed to the credential application executing on the mobile device 304. For example, the hyperlink information is used to send the contents of the QR code 306 to the associated app, which could be the credential application or a broker service (or browser extension) on mobile device 304 that passes the information to the preferred credential application. In various implementations, the hyperlinked QR code may commence an application-to-application communication session to transmit data to the credential application. The hyperlink may include some or all of the same data that is encoded in the QR code 306. The hyperlink may include additional data, in some cases.

The payload encoded in the QR code and the URL used in the hyperlink may be identical and is referred to as "disambiguation payload." A QR code can typically store more data than allowed by web browsers for maximum URL lengths. In some ISO standards, the transaction request that is generated in response to selection of the URL or scanning of the QR code may include a terminal authentication. Such authentication may deliver the necessary information that such terminal can be trusted and furthermore that the terminal is a match with the connected website. The terminal authentication approach, based on PKI, means that the credential application may need to confirm the terminal has a certificate issued by a Trusted Authority (TA) and that the certificate is a match with the connected website.

However, connecting to a website presents some risks and there should be ways to confirm the website before the connection takes place.

Some example solutions to confirm the verification device/service is a match include verifying that engagement data (included in the response data, such as a QR code or URL) is signed by a TA that ensures the engagement data is authentic, and therefore both URL and certificate pinning is sufficient to confirm the match; the engagement data may be signed, and the verification key is delivered by the verification service which confirms the match; and/or a key derivation process is performed to compute the encryption key for the communication with the verification service.

These solutions link the engagement to the verifier, but this generally may be insufficient to confirm the match with the website to which the user connected. Accordingly, additional or alternative examples, as described herein, provide a solution to ensure a connection between a credential application and a web service or website only takes place once the source of the engagement or information (e.g., proof of origin) has been confirmed. One example of a simple proof of origin is the name of the website that the user is connecting to (e.g., that the user has available). Depending on whether the engagement is, for example, through a single device or separate devices, the methods to gather proof of origin may vary.

In some examples, the credential application executing on a mobile device receives a disambiguation payload based on an interaction with a web service. The credential application receives information representing the web service and verifies that an identity of the web service matches the web service represented by the information. The credential application, in response to successfully verifying that the identity of the web service matches the web service represented by the information, provides one or more credentials from the credential application to the web service. In some examples, the information includes engagement data with proof of origin information. In some examples, the information includes a name of the web service.

In some examples, the disambiguation payload is received in response to a user interaction with the web service via an intermediate application installed on the mobile device. The user interaction can include selection of a link on a web page associated with the web service. In some examples, the disambiguation payload is received in response to a user interaction with the web service via an intermediate application installed on a given device that is separate from the mobile device. In such cases, the intermediate or credential application scans a QR code displayed by the intermediate application installed on the given device.

In some examples, the information is received by prompting, by the credential application, a user to input a name of the web service and comparing the name of the web service to the identity of the web service. In such cases, the credential application obtains the identity of the web service from the disambiguation payload. In some examples, the credential application generates for display a plurality of names of web services including the name of the web service and receives input that selects the name of the web service from the plurality of names of web service that is generated for display. In some examples, the plurality of names of web services includes randomly selected names of web services.

In some examples, the information is received by: prompting, by the credential application, a user to input a name of the web service; populating a placeholder in a URL associated with the disambiguation payload with the name of the web service input by the user; and establishing a connection between the credential application and the web service based on the populated placeholder in the URL.

In some examples, the information is received by: receiving, by the credential application from an intermediate application used to access the web service, a name of the web service and comparing the name of the web service to the identity of the web service separately received in the disambiguation payload. In some examples, the intermediate application receives a request from a user to connect to a web service. In response to the request, the intermediate application generates a URL of the web service, provides the URL from the intermediate application to the credential application, and establishes a connection between the credential application and the web service based on the URL received by the credential application from the intermediate application.

In some examples, the intermediate application includes a web browser. In some examples, the intermediate application generates a QR code, where the URL is provided to the credential application in response to the credential application scanning the QR code. In some aspects, the intermediate application is implemented by a first device separate from the mobile device. In such cases, the intermediate application generates a QR code, activates a camera application on the mobile device, and captures an image of the QR code by the mobile device.

In some examples, the URL associated with the QR code is opened by a second intermediate application implemented on the mobile device in response to capturing the image. The identity of the web service is provided from the second intermediate application to the credential application based on the opening of the URL. In some examples, the intermediate application and/or credential application generates for display an option to connect to the web service using the credential application in response to opening the URL.

In some examples, the proof of origin can be received via a separate channel from that used to connect to the web service and used to access the credential application. Namely, the engagement data can be used to trigger the credential application and then the name of the website to which the user connected (on the same device as the credential application and/or on a different device that was used to access the website) in the first place is separately or independently received. The name of the website can be received from a separate channel, which could be provided by the user or requested by the intermediate app and/or the credential application. The disclosed examples compare the name of the website received via the separate and independent channel with the name of the website received from the web service. If the two names of the websites match, the credential application presents a confirmation dialog box to the user and can receive confirmation from the user to proceed with the connection between the credential application and the web service via a URL received from the web service.

In an example scenario, the credential application can receive engagement data from the intermediate app that is installed on the same or different device as the credential application. The engagement data may be received using deep linking or similar method in cases where the intermediate app is on same device as the credential application or by presenting a QR code or similar mechanism for the credential application to scan when the intermediate app and credential application are on separate devices. In some cases, once the engagement data has been received, the credential application may require the name of the website to proceed with engaging with the corresponding verification service. In some examples, the user can manually provide such information to the credential application. For example, the user can type in the name of the connected website shown on the other device (e.g., the device with the triggering website or triggering intermediate app).

On separate devices (e.g., credential application is on a separate device than browser/intermediate app), the credential application might not be able to trust the displayed QR code of the other device to deliver the proof of origin. Moreover, the credential application generally cannot easily safely connect to the triggering website (or triggering app) displaying the QR code. Accordingly, the proof of origin could be delivered through an out-of-band communication (e.g., a separate channel or via separate means) and confirmed by the user or by the credential application automatically prior to connecting to the website. In some examples, it may be possible for the user to receive a text message, email, or other separate communication, and such examples are included within the scope of the present disclosure. In some examples, however, text messages and emails (or such similar kinds of separate channel communication) might not provide enough confidence that the sender is the website to which the user connected in the first place. Additionally, in some examples, such types of communication may permit a malicious website to collect the necessary personally identifiable information (PII) to send the out-of-band message.

Figure 4:
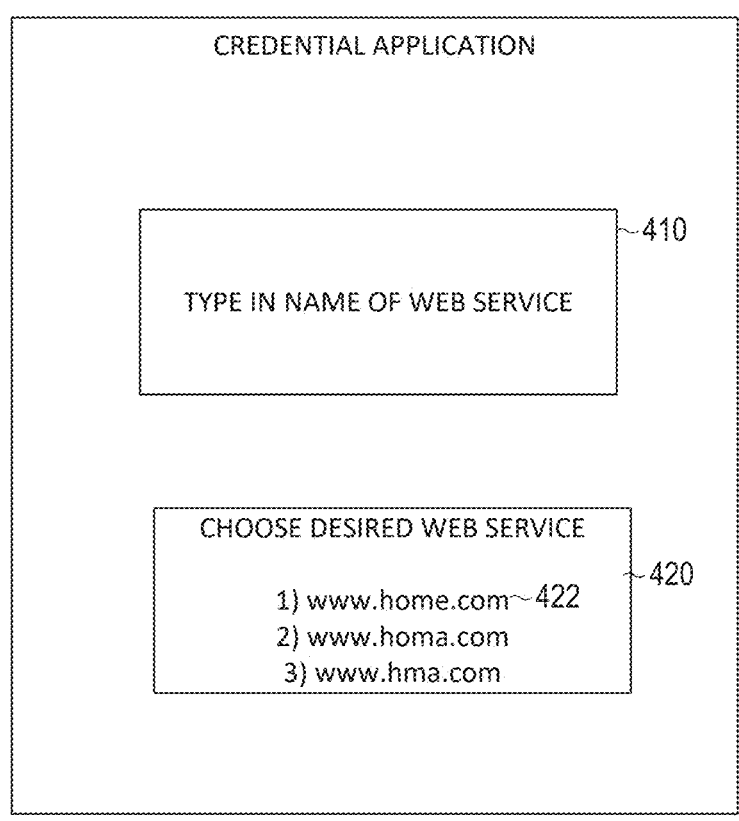
FIG. 4 illustrates an example user interface for confirming the website to connect to, according to some examples.

FIG. 4 illustrates an example user interface 400 for confirming the website to connect to, according to some examples. The user interface 400 may include a confirmation interface to allow the user to confirm that the user desires to connect to a service identified in the user interface 400. Specifically, the credential application can receive a disambiguation payload. The disambiguation payload can be received in response to an app-to-app communication, such as in response to a user selecting a URL on an intermediate app implemented on the same device as the credential application. The disambiguation payload can be received in response to the credential application scanning or capturing an image and decoding a QR code that is presented on an intermediate app on a separate device from the credential application. Once the credential application receives the disambiguation payload, the credential application can present the user interface 400 to the user. The user interface 400 can include one or more web service name confirmation regions 410 and 420.

For example, the credential application can present a name confirmation region 410. The name confirmation region 410 can include a text entry region (not shown) through which the user can type in the name of the web service that triggered the engagement with the credential application. In some cases, the name confirmation region 410 can include a message with instructions for the user to manually type in the name of the web service and/or title of the website that was accessed to trigger the engagement. In some examples, the name of the web service received from the name confirmation region 410 can be stored by the credential application as information representing the web service that is received from a separate channel or external source. The credential application can retrieve the name of the web service from the previously received disambiguation payload and can compare the name input by the user via the name confirmation region 410 with the name or identity provided in the disambiguation payload. In response to determining that the name input by the user matches more than a threshold quantity of characters with the name of the web service in the disambiguation payload, the credential application can determine that the web service is verified and can allow sharing of one or more credentials from the credential application and the web service. Otherwise, the credential application can request that the user retype in the name of the web service or can deny the connection entirely.

As another example, the credential application can present a name confirmation region 420. The name confirmation region 420 can include a list of names 422 of different web services that can be randomly selected or generated using a name of the web service received in the disambiguation payload. For example, the credential application can scramble some of the characters in the name of the web service received in the disambiguation payload a certain number of times to generate a random list of web services. The credential application can also randomly select a list of known website names to include in the displayed list of names 422. The credential application can include in the list of names 422 the actual name of the web service received in the disambiguation payload. As a result, the list of names 422 includes a set of unrelated names or non-real names of web services and the name of the web service received in the disambiguation payload. In some cases, the second name confirmation region 420 can include a message with instructions for the user to select the name of the website or web service that was accessed to trigger the engagement from the list of names 422. In response to determining that the name selected by the user from the list of names 422 corresponds to the name of the web service in the disambiguation payload, the credential application can determine that the web service is verified and can allow sharing of one or more credentials from the credential application and the web service. Otherwise, the credential application can request that the user re-select the name of the web service from the list of names 422 and/or type in the name in region 410 or can deny the connection entirely.

In cases, when the intermediate app and credential application are on the same device, the credential application could use an application-to-application (app-to-app) communication (e.g., the credential application can directly communicate with the intermediate application) to receive the website information. For example, the credential application may request the title of the webpage from the intermediate app. When receiving the website name from the intermediate app, the credential application may further confirm the intermediate app is an authorized app. For example, the credential application may check during the application-to-application exchange that the intermediate app is on a predetermined list of Internet browsers and therefore can be trusted.

Figure 5:
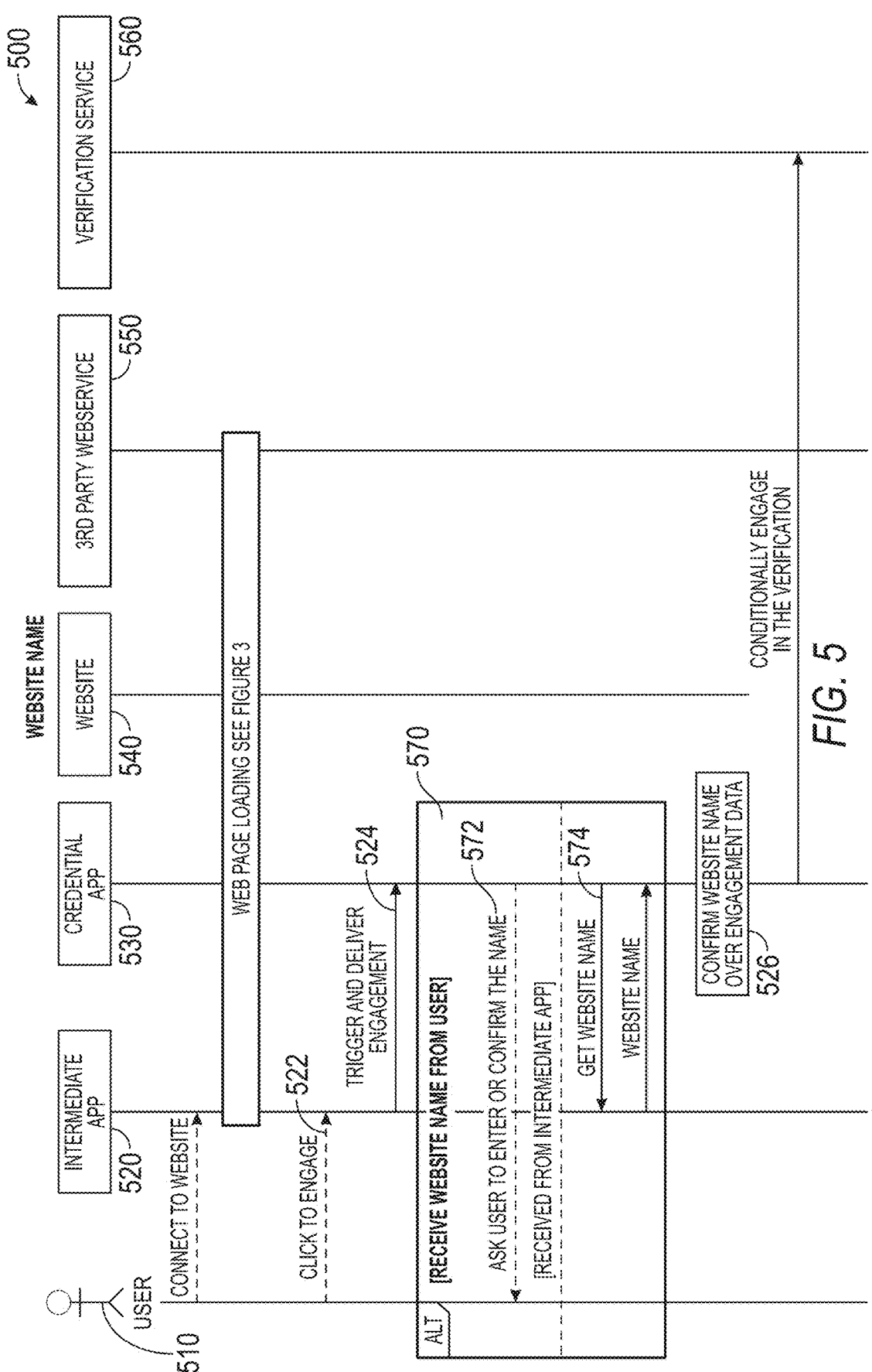
FIGS. 5, 6, and 7 are message sequence diagrams, according to some examples.

FIG. 5 is a message sequence diagram illustrating an online interaction, according to some examples. While the various processes will be described in accordance with illustrative steps performed in a particular order, it should be appreciated that examples of the present disclosure are not so limited and that any of the process steps depicted and described herein can be performed in any order or in parallel with one another.

The online interaction is between a credential application 530, an intermediate app 520, a website 540, a 3$^{rd}$ party web service 550 that is associated with the website 540, and a verification service 560. Using the intermediate app 520, a user 510 is able to conduct online transactions. The intermediate app 520 may be a web browser or other application that incorporates Internet browsing capabilities. In some cases, the intermediate app 520 is implemented on the same device as the credential application 530. In some cases, the intermediate app 520 is implemented on a separate device from the device used to implement the credential application 530. Example online transactions include, but are not limited to, banking, shopping, real estate rentals or purchases, vehicle rentals, auction services, airline reservation or check in, or the like.

A user 510 may use the intermediate app 520 to interact with the web service 550 via the website 540 in an online transaction. During a session, a web service document is returned by the web service 550 via a web page loading sequence or set of operations. The web service document may be one of many types of documents, such as those in hypertext markup language (HTML) format and corresponding technologies. The web service document may reference content from other services which are received by the intermediate app 520 as part of the process to present the document to the user 510.

Part of the information received by the intermediate app 520 is the disambiguation payload which is optionally checked before presenting it to the user 510. The check may be performed within the intermediate app 520, an extension or plugin to the intermediate app 520, or a companion application executing on the same device as the intermediate app 520.

The intermediate app 520 presents the disambiguation payload to the user 510. The disambiguation payload may be presented as an image representing a QR code. In some cases, the disambiguation payload may be encapsulated in a hyperlink associated with a URL and presented as active content (e.g., a hyperlink, active user interface scripting element, or the like), such that when a user activates the hyperlink (e.g., click), the intermediate app 520 may either navigate to the network location encoded in the URL or recognize the URL as associated with an application or service on the same computing device and accordingly provide the URL to the associated application, such as the credential application 530.

The user may scan the QR code with their mobile device to obtain the disambiguation payload (operation 522) and thereby to engage with the web service 550. In an implementation, the user is able to open the credential application 530, enter an image capture mode in the credential application, and capture an image of the QR code with a camera in the mobile device.

Alternatively, the user may be conducting the online transaction with a computer that has the credential application 530 installed on it, as in this case it isn't convenient to scan the QR code with the same computer. The user may then do an action such as clicking the QR code or otherwise activate it, while it is presented in the intermediate app 520. The clicking or other action initiates a communication with the credential application 530, where at operation 524, the intermediate app 520 is able to transfer the contents of the disambiguation payload (e.g., the QR code) to the credential application 530. This can be referred to as triggering and delivering the engagement data to the credential application 530.

At operation 570, the credential application 530 analyzes the disambiguation data provided from the QR code or from the active content (e.g., URL). The disambiguation data is parsed to get the information to connect to. Then, during or after operation 526, where the web service 550 or website 540 is verified by the credential application 530, the credential application 530 may perform a set of operations to verify the proof of origin of the disambiguation payload and/or the web service 550 or website 540.

For example, the credential application 530 can present the user interface 400 (shown in FIG. 4) to confirm the name of the web service 550 in operation 572. Namely, the credential application 530 can request or ask the user to enter the name of the web service 550 manually and/or select the name from a list of names 422 generated by the credential application 530. In some cases, the credential application 530 can determine that the disambiguation payload includes a URL with a placeholder for the name of the web service 550. In such cases, the credential application 530 can populate the name of the web service 550 in the URL to complete the URL. The credential application 530 can then access the URL and present the content of the URL which has been completed based on the manual entry of the characters or name of the web service 550 received from the user 510. The user can verify that the presented content matches the website 540 that was presented by the intermediate app 520. In such cases, the user can select a confirm button to verify that the disambiguation payload corresponds to the intended or verified web service 550.

For example, the verification service URL in the engagement data may be missing a portion corresponding to the title. Namely, if COMPANY_X wants to engage with the credential application 530, the URL to connect might be www.COMPANY_X.com. However, the engagement data might contain the URL with a placeholder, such as www. [PlaceHolder].com/. . . . The credential application 530 may replace the placeholder with the title (e.g., "COMPANY_X") received from the user manually or selected from a list to connect.

In some cases, the credential application 530 and the intermediate app 520 are implemented on the same device. In such cases, the credential application 530 can perform operations 574 to receive the website name directly from the intermediate app 520. The credential application 530 can then verify that the name received from the intermediate app 520 matches the name of the web service 550 received in the disambiguation payload. In response to determining that the names match, the credential application 530 allows the connection with the web service 550.

At this point, the user 510 may share credential information with the web service 550 to continue the online transaction, such as after operation 526 is completed.

Figure 6:
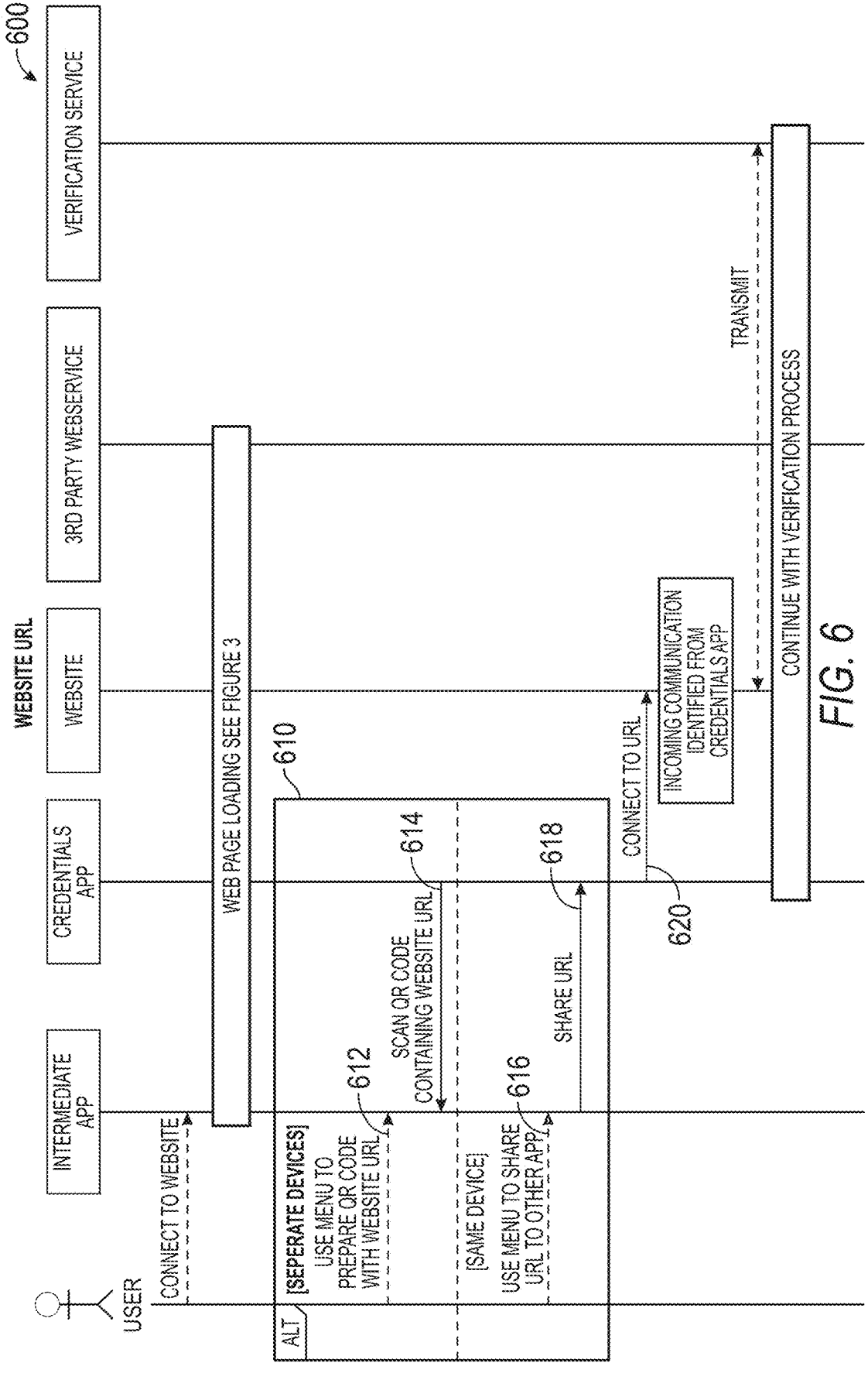

In some cases, the website URL can be received by the credential application 530 via the intermediate app 520, as shown in the sequence diagram 600 of FIG. 6. In an example scenario, the intermediate app is used to share the website URL to the credential application. In this scenario, instead of clicking on a link from content which may be from the third-party service (and that could be malicious), the intermediate app is used instead. Specifically, the intermediate app 520 implemented on a first client device can receive input from the user to connect to a website 540. In response, the intermediate app 520 can load the contents of the website 540 (as discussed above) and can present the contents to the user. The intermediate app 520 can provide a URL of the website 540 to the credential application 530 in a secure manner by performing a set of the operations 610.

In cases, where the first client device used to implement the intermediate app 520 is separate from a second client device used to execute the credential application 530, the intermediate app 520 can prepare a QR code with the website URL that has been accessed, at operation 612. The user can open the credential application 530 on the second client device and can scan the QR code prepared by the intermediate app 520 using the credential application 530 at operation 614. The credential application 530, at operation 620, can then connect to the website 540 using the URL decoded from the QR code, such as after performing operation 526 where the website name is confirmed using the engagement data. In some examples, the set of operations 610 can be performed and following completion of the set of operations 610, the process proceeds to perform operation 570 (FIG. 5). In such cases, the user is requested to input the name of the website and/or the name of the website is received from an intermediate application and the name is matched up with the name of the website received in the engagement data.

The credential application 530 can receive input from a user selecting engagement data or disambiguation information from the connected website 540 and can perform the above operations of FIG. 5 to verify the identity of the website 540 associated with the interaction or selected engagement data.

In cases where the first client device used to implement the intermediate app 520 is the same as the client device used to execute the credential application 530, the intermediate app 520 can, at operation 616, present a menu for a user to select an option to connect to the credential application 530. The intermediate app 520 can receive input from the user selecting the option and, in response, the intermediate app 520, at operation 618, provides the website URL to the credential application 530. The credential application 530, at operation 620, can then connect to the website 540 using the URL received from the intermediate app 520. The credential application 530 can receive input from a user selecting engagement data or disambiguation information from the connected website 540 and can perform the above operations of FIG. 5 to verify the identity of the website 540 associated with the interaction or selected engagement data.

Figure 7:
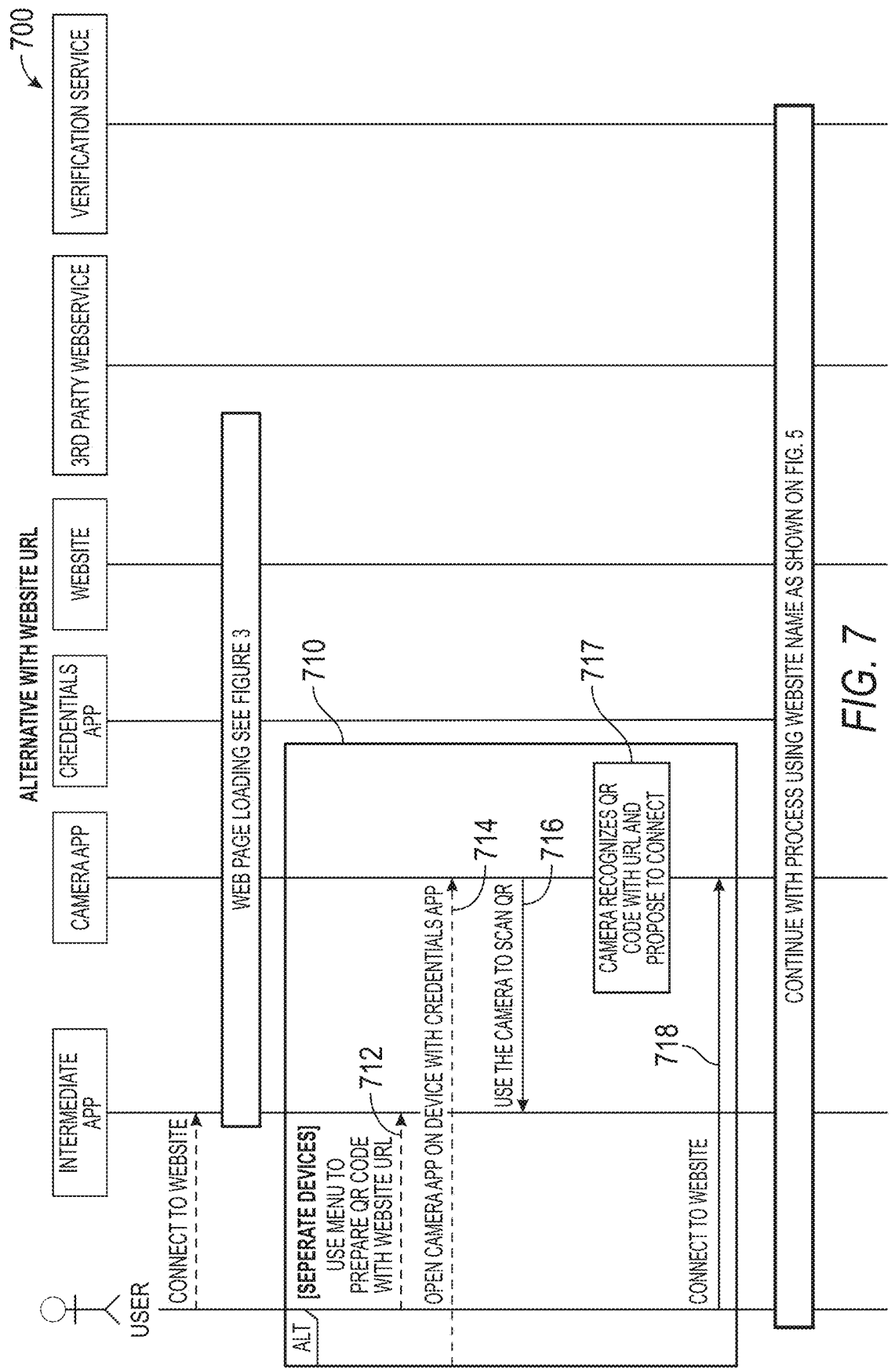

When the intermediate app 520 is implemented on a separate device from the device used to implement the credential application 530, an alternative example set of operations 700 (illustrated in FIG. 7) can be used. In the set of operations 700, the intermediate app 520 is used to access the website 540. Then or before, a menu is presented as part of operation 710. In operation 712, the user can specify a request to prepare a QR code for the website 540. In response to the input, the intermediate app 520 generates the QR code and presents the QR code in a user interface or display of the intermediate app 520. At operation 714, the user uses the device on which the credential application 530 is implemented to activate a camera application. The camera application, at operation 716, scans the QR code being displayed by the intermediate app 520 and, at operation 717, the camera app decodes the URL from the QR code.

The camera app provides and displays an option for the user to select to engage with the credential application 530. In response to receiving input from the user to engage with the credential application 530 based on the display of the option with the camera app, at operation 718, the credential application 530 is connected to the website 540. Thereafter, the solution for the website name, as described above in connection with FIGS. 4 and 5, can be used at least in part to continue with the verification.

FIG. 8 is a flowchart illustrating a method 800 for securely transacting over the Internet, according to some examples. Although the flowchart can describe the operations as a sequential process, many of the operations can be performed in parallel or concurrently. In addition, the order of the operations may be re-arranged. A process is terminated when its operations are completed. A process may correspond to a method, a procedure, and the like. The steps of methods may be performed in whole or in part, may be performed in conjunction with some or all of the steps in other methods, and may be performed by any number of different systems or any portion thereof, such as a processor included in any of the systems.

At operation 801, a credential application (e.g., the credential application 530) executing on a mobile device receives a disambiguation payload based on an interaction with a web service (e.g., web service 550), as discussed above.

At operation 802, the credential application receives information representing the web service, as discussed above.

At operation 803, the credential application verifies that an identity of the web service (e.g., indicated in the disambiguation payload) matches the web service represented by the information, as discussed above.

At operation 804, the credential application, in response to successfully verifying that the identity of the web service matches the web service represented by the information, provides one or more credentials from the credential application to the web service, as discussed above.

FIG. 9 is a flowchart illustrating a method 900 for confirming a website before connecting to the website, according to some examples. Although the flowchart can describe the operations as a sequential process, many of the operations can be performed in parallel or concurrently. In addition, the order of the operations may be re-arranged. A process is terminated when its operations are completed. A process may correspond to a method, a procedure, and the like. The steps of methods may be performed in whole or in part, may be performed in conjunction with some or all of the steps in other methods, and may be performed by any number of different systems or any portion thereof, such as a processor included in any of the systems.

At operation 901, an intermediate application (e.g., the intermediate app 520) receives a request form a user to connect to a web service (e.g., web service 550), as discussed above.

At operation 902, the intermediate application, in response to the request, generates a URL of the web service, as discussed above.

At operation 903, the intermediate application provides the URL to the credential application (e.g., the credential application 530), as discussed above.

At operation 904, the intermediate application establishes a connection between the credential application and the web service based on the URL provided to and received by the credential application, as discussed above.

Figure 10:
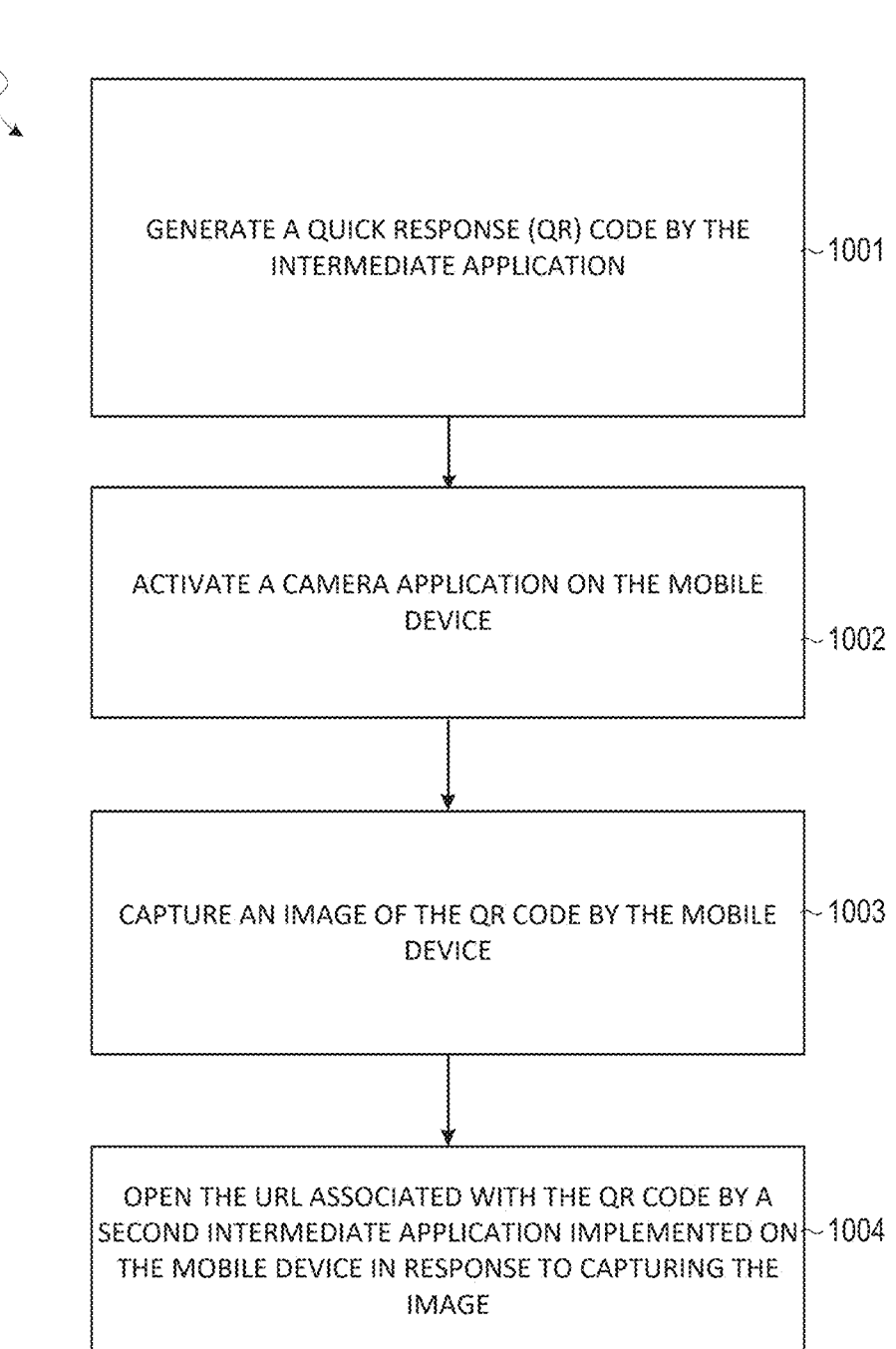
FIG. 10 is a flowchart illustrating a method for securely transacting over the Internet, according to some examples.

FIG. 10 is a flowchart illustrating a method 1000 for securely transacting over the Internet, according to some examples. Although the flowchart can describe the operations as a sequential process, many of the operations can be performed in parallel or concurrently. In addition, the order of the operations may be re-arranged. A process is terminated when its operations are completed. A process may correspond to a method, a procedure, and the like. The steps of methods may be performed in whole or in part, may be performed in conjunction with some or all of the steps in other methods, and may be performed by any number of different systems or any portion thereof, such as a processor included in any of the systems.

At operation 1001, an intermediate application (e.g., the intermediate app 520 implemented on a first device) generates a QR code, as discussed above.

At operation 1002, a camera application of a mobile device is activated, as discussed above.

At operation 1003, the mobile device captures an image of the QR code, as discussed above.

At operation 1004, a second intermediate application implemented on a second device opens the URL in response to capturing the image by the camera application, as discussed above.

Each of the methods described in FIGS. 5-10 (above and below) may be used independently or combined together in various combinations.

Figure 11:
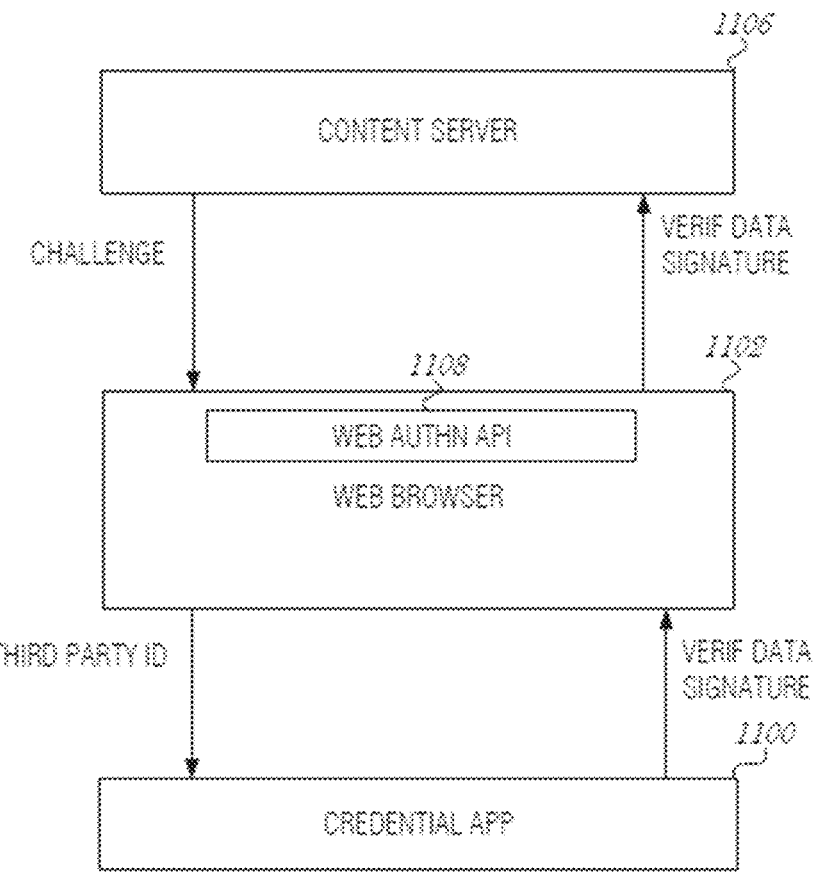
FIG. 11 is a block diagram illustrating a framework for identity verification using a Web Authorization Application Program Interface (WebAuthn API), according to some examples.

FIG. 11 is a block diagram illustrating a framework for identity document verification using an API (e.g., a Web-Authn API). The credential application 1100 and the web browser 1102 may reside in the mobile device. The web browser 1102 interacts with the content server 1106 of the third party (e.g., the relaying party) and the web browser 1102 may be an intermediate app. The web browser 1102 includes an API 1108 that also resides in the mobile device. The web page from the web service calls the API to request authentication. The API receives a challenge formatted to be recognized as a request for one or more credentials. When responding to the formatted challenge, the API returns the requested identity data (e.g., in the authenticator assertion response from a WebAuthn API).

The format of the challenge from the content server 1106 may be recognizable by another party's code (which may be malicious) as an identity verification challenge that will return requested identity data elements. To provide additional security, the response of the credential application 1100 to the challenge may be expanded to include a list of requested credentials encrypted or otherwise protected with a signature of the identity data issuer.

The systems and methods described herein facilitate using an identify document as an identity credential. However, an issue that can arise is how to handle a change in the identity document without locking out users when the change occurs. An approach is to use to use identity data that remains unchanged between identity documents owned by a single person. For example, the credentials could be computed from "full name", "date of birth", "city of birth", etc.

With data minimization, a mobile identity credential may contain information such as unique national identifier (e.g., a person's social security number) and this could be used instead of some other data elements subject to be changed (e.g., a person's name). The identity data elements could be hashed together to create a unique identifier. This unique identifier credential could be used along with biometrics to confirm that the information is provided under the control of the identity owner. Performing a match between the identity credential and biometric data can be performed on the mobile device or on the system backend.

The request for an identity credential could be for such a unique identifier credential. This would result in increased privacy because a hash of specified data elements is returned instead of the actual data elements. The hash of identity elements could be combined with biometrics and the biometrics used to recover a signature key. Biometrics could be used to match with backend data or to recover a signature key using a biometric token and the biometric data. The signature key can be used to verify identity to respond to a challenge.

Example System Components

Embodiments may be implemented in one or a combination of hardware, firmware, and software. Embodiments may also be implemented as instructions stored on a machine-readable storage device, which may be read and executed by at least one processor to perform the operations described herein. A machine-readable storage device may include any non-transitory mechanism for storing information in a form readable by a machine (e.g., a computer). For example, a machine-readable storage device may include read-only memory (ROM), random-access memory (RAM), magnetic disk storage media, optical storage media, flash-memory devices, and other storage devices and media.

A processor subsystem may be used to execute the instruction on the machine-readable medium. The processor subsystem may include one or more processors, each with one or more cores. Additionally, the processor subsystem may be disposed on one or more physical devices. The processor subsystem may include one or more specialized processors, such as a graphics processing unit (GPU), a digital signal processor (DSP), a field programmable gate array (FPGA), or a fixed function processor.

Examples, as described herein, may include, or may operate on, logic or a number of components, modules, or mechanisms. Modules may be hardware, software, or firmware communicatively coupled to one or more processors in order to carry out the operations described herein. Modules may be hardware modules, and as such modules may be considered tangible entities capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine-readable medium. In an example, the software, when executed by the underlying hardware of the module, causes the hardware to perform the specified operations. Accordingly, the term hardware module is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software; the general-purpose hardware processor may be configured as respective different modules at different times. Software may accordingly configure a hardware processor, for example, to constitute a particular module at one instance of time and to constitute a different module at a different instance of time. Modules may also be software or firmware modules, which operate to perform the methodologies described herein.

Circuitry or circuits, as used in this document, may comprise, for example, singly or in any combination, hardwired circuitry, programmable circuitry such as computer processors comprising one or more individual instruction processing cores, state machine circuitry, and/or firmware that stores instructions executed by programmable circuitry. The circuits, circuitry, or modules may, collectively or individually, be embodied as circuitry that forms part of a larger system, for example, an integrated circuit (IC), system on-chip (SoC), desktop computers, laptop computers, tablet computers, servers, smart phones, etc.

As used in any embodiment herein, the term "logic" may refer to firmware and/or circuitry configured to perform any of the aforementioned operations. Firmware may be embodied as code, instructions or instruction sets and/or data that are hard-coded (e.g., nonvolatile) in memory devices and/or circuitry.

Figure 12:
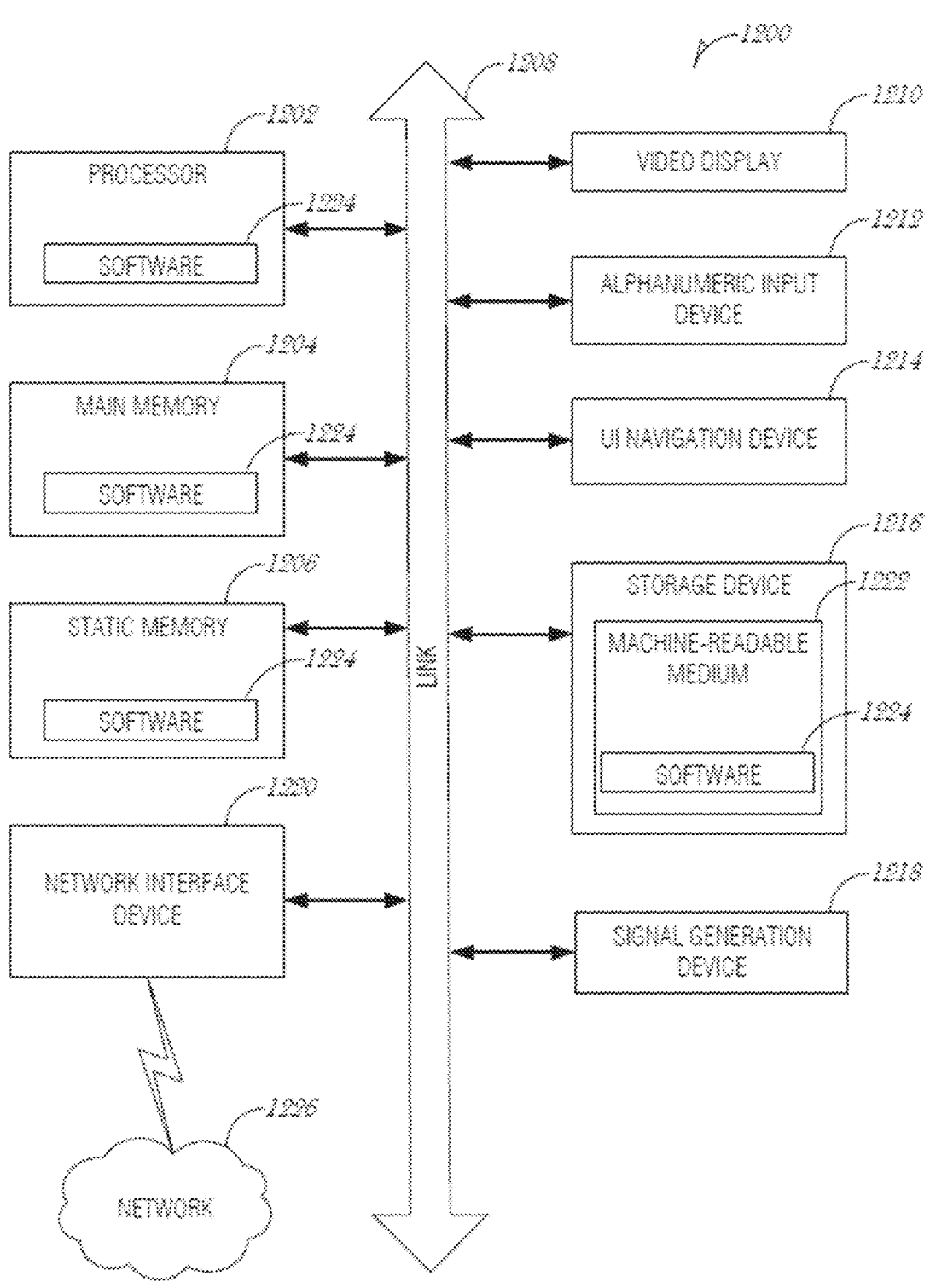
FIG. 12 is a block diagram illustrating an example machine upon which any one or more of the techniques (e.g., methodologies) discussed herein may perform, according to some examples.

"Circuitry," as used in any embodiment herein, may comprise, for example, singly or in any combination, hardwired circuitry, programmable circuitry, state machine circuitry, logic and/or firmware that stores instructions executed by programmable circuitry. The circuitry may be embodied as an integrated circuit, such as an integrated circuit chip. In some embodiments, the circuitry may be formed, at least in part, by the processor circuitry executing code and/or instructions sets (e.g., software, firmware, etc.) corresponding to the functionality described herein, thus transforming a general-purpose processor into a specific-purpose processing environment to perform one or more of the operations described herein. In some embodiments, the processor circuitry may be embodied as a stand-alone integrated circuit or may be incorporated as one of several components on an integrated circuit. In some embodiments, the various components and circuitry of the node or other systems may be combined in a system-on-a-chip (SoC) architecture FIG. 12 is a block diagram illustrating a machine in the example form of a computer system 1200, within which a set or sequence of instructions may be executed to cause the machine to perform any one of the methodologies discussed herein, according to an embodiment. In alternative embodiments, the machine operates as a standalone device or may be connected (e.g., networked) to other machines. In a networked deployment, the machine may operate in the capacity of either a server or a client machine in server-client network environments, or it may act as a peer machine in peer-to-peer (or distributed) network environments. The machine may be a mobile device, a personal computer (PC), a tablet PC, a hybrid tablet, a personal digital assistant (PDA), a mobile telephone, a kiosk, a beacon, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. Similarly, the term "processor-based system" shall be taken to include any set of one or more machines that are controlled by or operated by a processor (e.g., a computer) to individually or jointly execute instructions to perform any one or more of the methodologies discussed herein.

Example computer system 1200 includes at least one processor 1202 (e.g., a central processing unit (CPU), a graphics processing unit (GPU) or both, processor cores, compute nodes, etc.), a main memory 1204 and a static memory 1206, which communicate with each other via a link 1208 (e.g., bus). The computer system 1200 may further include a video display unit 1210, an alphanumeric input device 1212 (e.g., a keyboard), and a user interface (UI) navigation device 1214 (e.g., a mouse). In one embodiment, the video display unit 1210, input device 1212 and UI navigation device 1214 are incorporated into a touch screen display. The computer system 1200 may additionally include a storage device 1216 (e.g., a drive unit), a signal generation device 1218 (e.g., a speaker), a network interface device 1220, and one or more sensors (not shown), such as a global positioning system (GPS) sensor, compass, accelerometer, gyrometer, magnetometer, or other type of sensor.

The storage device 1216 includes a machine-readable medium 1222 on which is stored one or more sets of data structures and instructions 1224 (e.g., software) embodying or utilized by any one or more of the methodologies or functions described herein. The instructions 1224 may also reside, completely or at least partially, within the main memory 1204, static memory 1206, and/or within the processor 1202 during execution thereof by the computer system 1200, with the main memory 1204, static memory 1206, and the processor 1202 also constituting machine-readable media.

While the machine-readable medium 1222 is illustrated in an example embodiment to be a single medium, the term "machine-readable medium" may include a single medium or multiple media (e.g., a centralized or distributed database, and/or associated caches and servers) that store the one or more instructions 1224. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

The instructions 1224 may further be transmitted or received over a communications network 1226 using a transmission medium via the network interface device 1220 utilizing any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., Bluetooth, Wi-Fi, 3G, and 4G LTE/LTE-A, 5G, DSRC, or WiMAX networks). The term "transmission medium" shall be taken to include any intangible medium that is capable of storing, encoding, or carrying instructions for execution by the machine, and includes digital or analog communications signals or other intangible medium to facilitate communication of such software.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplated are examples using any combination or permutation of those elements shown or described (or one or more aspects thereof), either with respect to a particular example (or one or more aspects thereof), or with respect to other examples (or one or more aspects thereof) shown or described herein.

Publications, patents, and patent documents referred to in this document are incorporated by reference herein in their entirety, as though individually incorporated by reference. In the event of inconsistent usages between this document and those documents so incorporated by reference, the usage in the incorporated reference(s) are supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to suggest a numerical order for their objects.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

What is claimed is:

1. A method comprising:
receiving, at a credential application executing on a mobile device, a disambiguation payload based on an interaction with a web service;
receiving, by the credential application, information representing the web service by:
generating a list of web service names comprising a name of the web service specified in the disambiguation payload and one or more names of web services that are unrelated to the web service associated with the disambiguation payload; and
receiving, as the information, input from a user that selects an individual web service name from the list of web service names;
verifying, by the credential application, that an identity of the web service matches the web service represented by the information; and
in response to successfully verifying that the identity of the web service matches the web service represented by the information, connecting to the web service for providing one or more credentials from the credential application.

2. The method of claim 1, wherein the information comprises engagement data with proof of origin information.

3. The method of claim 1, wherein the one or more names of the web services that are unrelated to the web service associated with the disambiguation payload are generated using the name of the web service specified in the disambiguation payload by scrambling one or more characters of the name of the web service specified in the disambiguation payload.

4. The method of claim 1, wherein the disambiguation payload is received in response to a user interaction with the web service via an intermediate application installed on the mobile device, the user interaction comprising selection of a link on a web page associated with the web service.

5. The method of claim 1, wherein the disambiguation payload is received in response to a user interaction with the web service via an intermediate application installed on a given device that is separate from the mobile device.

6. The method of claim 5, further comprising:
scanning, by the intermediate application, a quick response (QR) code displayed by the mobile device.

7. The method of claim 1, wherein receiving the information comprises:
prompting, by the credential application, a user to input a name of the web service; and
comparing the name of the web service to the identity of the web service.

8. The method of claim 7, further comprising obtaining the identity of the web service from the disambiguation payload.

9. The method of claim 1, further comprising:

determining that the individual web service name selected by the input from the list of web service names fails to correspond to the name of the web service specified in the disambiguation payload; and in response to determining that the individual web service name selected by the input from the list of web service names fails to correspond to the name of the web service specified in the disambiguation payload, requesting additional input from the user to re-select a name from the list of web service names.

10. The method of claim 1, wherein the list of web service names comprises one or more randomly selected names of web services.

11. The method of claim 1, wherein receiving the information comprises:

prompting, by the credential application, a user to input a name of the web service;

populating a placeholder in a universal resource locator (URL) associated with the disambiguation payload with the name of the web service input by the user; and establishing a connection between the credential application and the web service based on the populated placeholder in the URL.

12. The method of claim 1, wherein receiving the information comprises:

populating a placeholder in a universal resource locator (URL) associated with the disambiguation payload with the individual web service name received by user input.

13. The method of claim 1, further comprising:

receiving by an intermediate application a request from a user to connect to the web service;

in response to the request, accessing, by the intermediate application, a universal resource locator (URL) of the web service;

providing the accessed URL from the intermediate application to the credential application; and establishing a connection between the credential application and the web service based on the URL received by the credential application from the intermediate application.

14. The method of claim 13, wherein the intermediate application comprises a web browser.

15. The method of claim 14, further comprising:

generating a quick response (QR) code by the intermediate application, wherein the URL is provided to the credential application in response to the credential application scanning the QR code.

16. The method of claim 13, wherein the intermediate application is implemented by a first device separate from the mobile device, further comprising:

generating a quick response (QR) code by the intermediate application;

activating a camera application on the mobile device; and capturing an image of the QR code by the mobile device.

17. The method of claim 16, further comprising:

opening the URL associated with the QR code by a second intermediate application implemented on the mobile device in response to capturing the image; and providing the identity of the web service from the second intermediate application to the credential application based on the opening of the URL.

18. The method of claim 17, further comprising:

generating for display an option to connect to the web service using the credential application in response to opening the URL.

19. A system comprising:

one or more processors configured to perform operations comprising:

receiving, at a credential application executing on a mobile device, a disambiguation payload based on an interaction with a web service;

receiving, by the credential application, information representing the web service by:

generating a list of web service names comprising a name of the web service specified in the disambiguation payload and one or more names of web services that are unrelated to the web service associated with the disambiguation payload; and receiving, as the information, input from a user that selects an individual web service name from the list of web service names;

verifying, by the credential application, that an identity of the web service matches the web service represented by the information; and in response to successfully verifying that the identity of the web service matches the web service represented by the information, connecting to the confirmed web service for providing one or more credentials from the credential application.

20. The system of claim 19, wherein the operations comprise:

in response to verifying that the identity of the web service matches the web service represented by the information, prompting a user to provide input that selects the one or more credentials from a list of credentials;

receiving input from a user that selects the one or more credentials from the list of credentials, wherein the one or more credentials are provided in response to the input.

21. An apparatus comprising:

means for receiving, at a credential application executing on a mobile device, a disambiguation payload based on an interaction with a web service;

means for receiving, by the credential application, information representing the web service by:

generating a list of web service names comprising a name of the web service specified in the disambiguation payload and one or more names of web services that are unrelated to the web service associated with the disambiguation payload; and receiving, as the information, input from a user that selects an individual web service name from the list of web service names;

means for verifying, by the credential application, that an identity of the web service matches the web service represented by the information; and means for, in response to successfully verifying that the identity of the web service matches the web service represented by the information, connecting to the confirmed web service for providing one or more credentials from the credential application.

* * * * *